Sept. 18, 1962 F. A. F. SCHMIDT 3,054,393
FUEL INJECTION SYSTEM
Filed Feb. 4, 1958 20 Sheets-Sheet 1
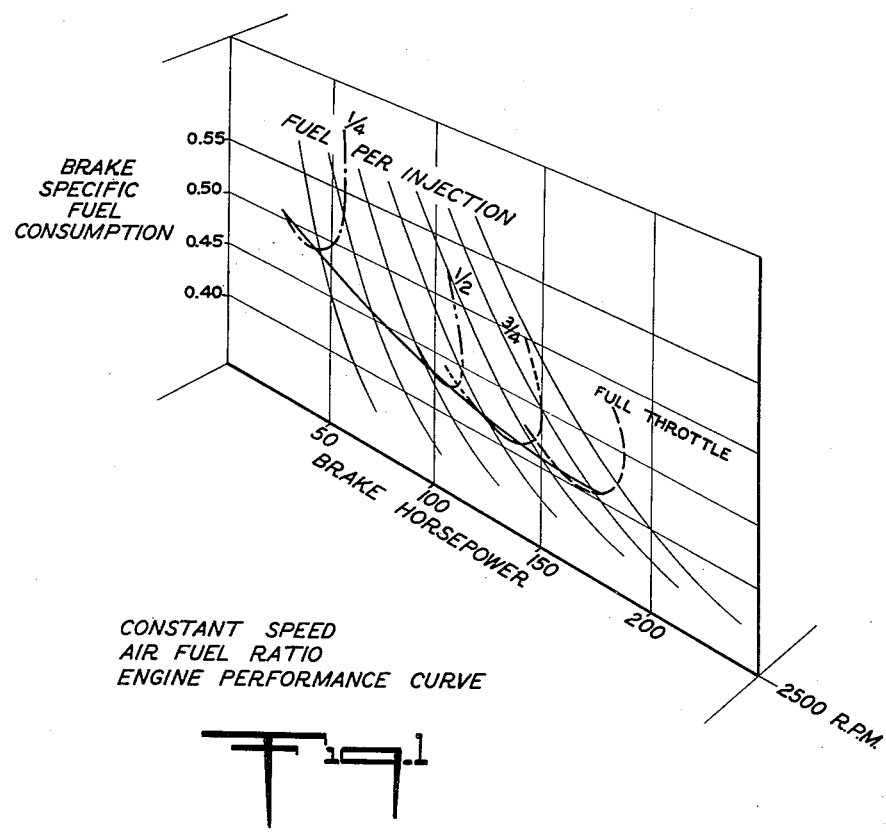
CONSTANT SPEED
AIR FUEL RATIO
ENGINE PERFORMANCE CURVE
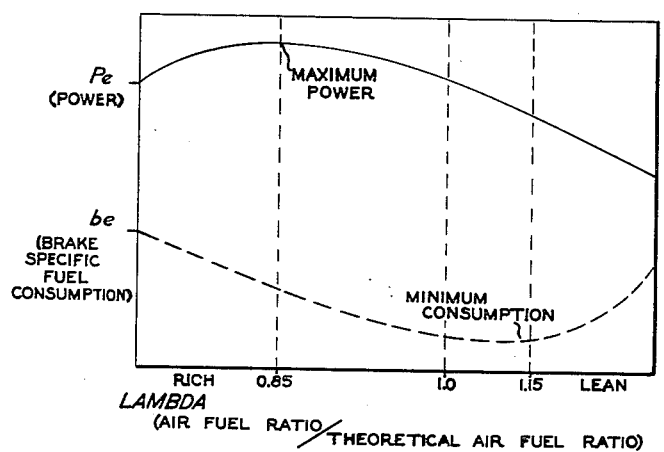
INVENTOR
FRITZ A. F. SCHMIDT
BY Burgess, Dinklage & Sprung
ATTORNEYS

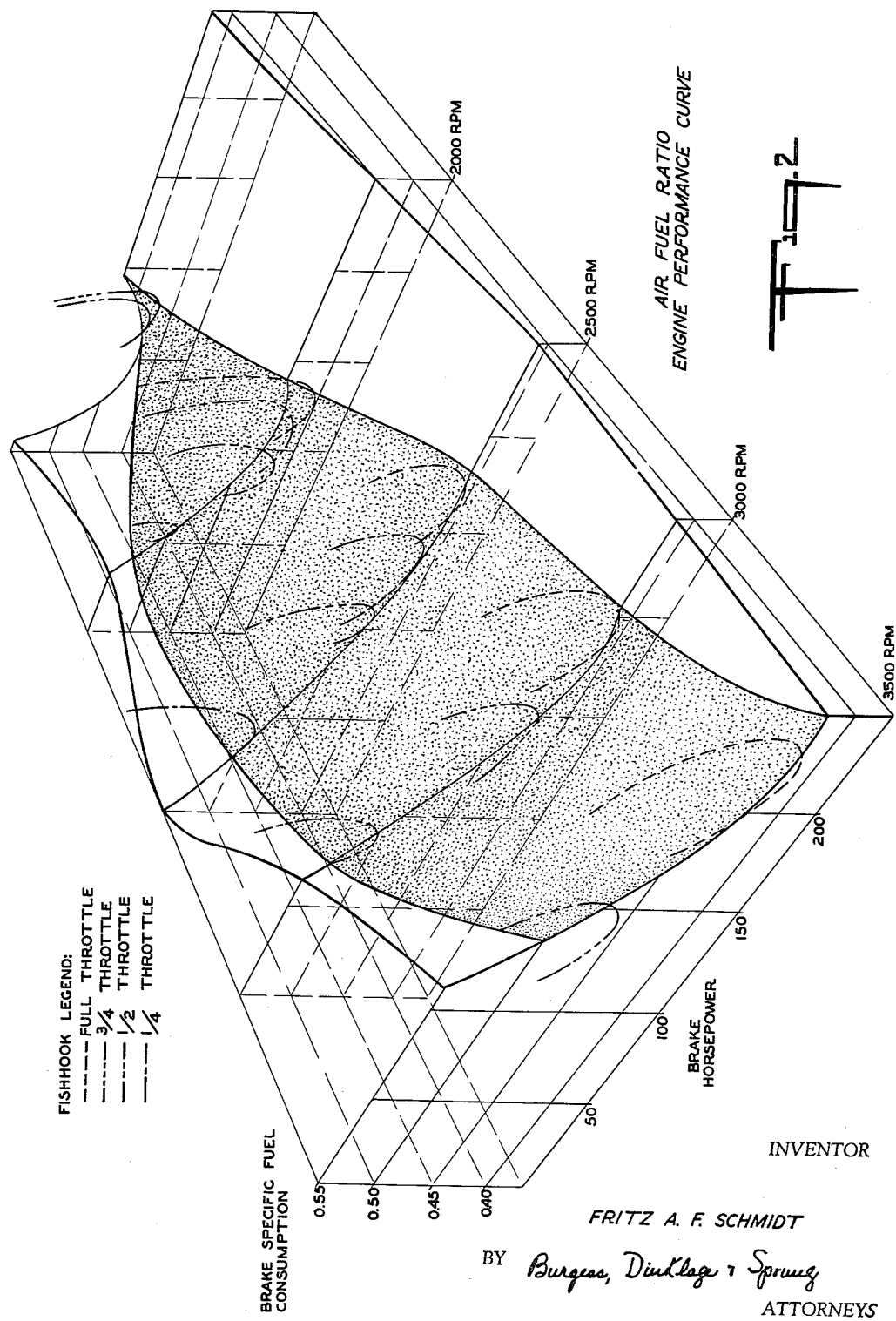

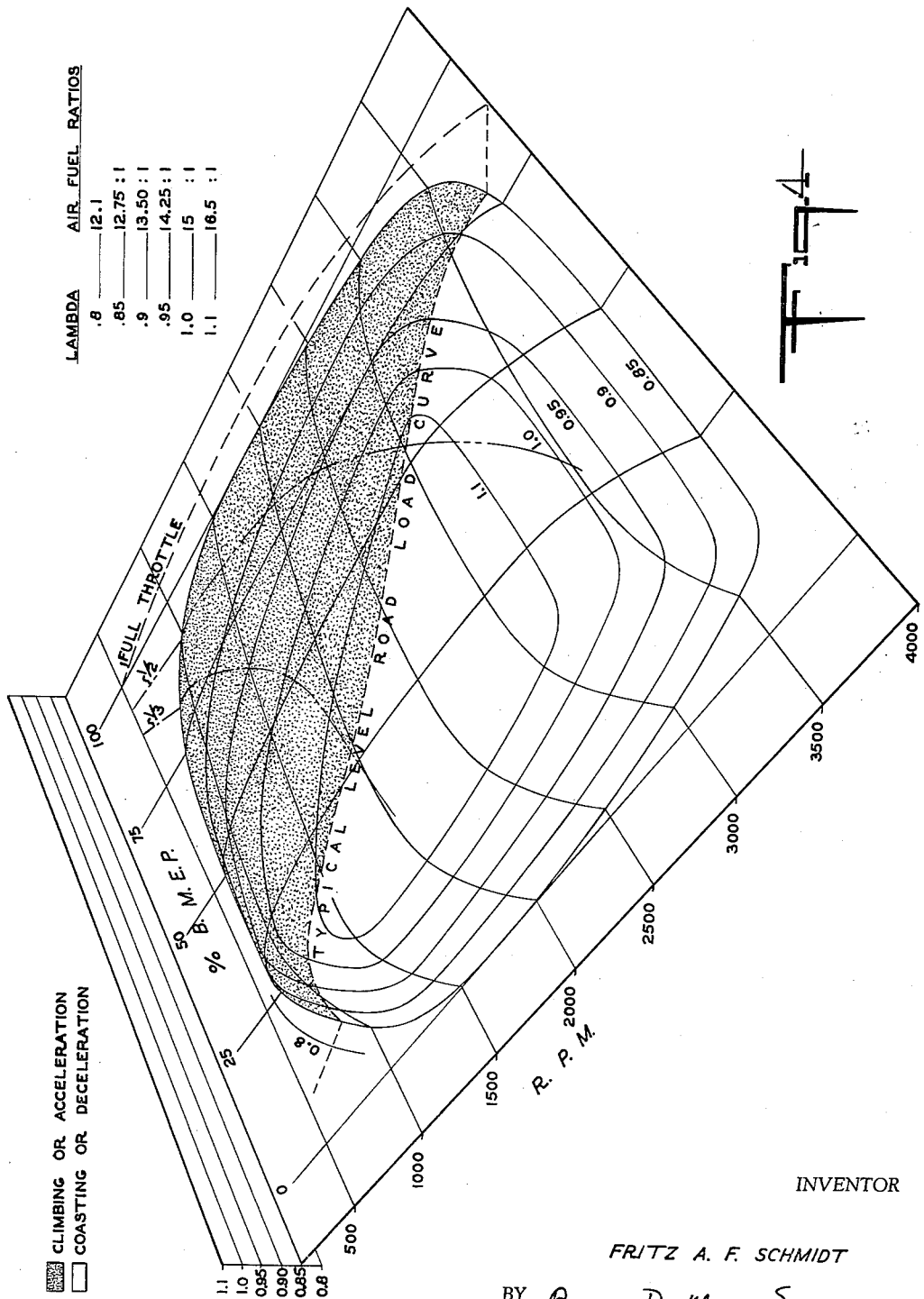

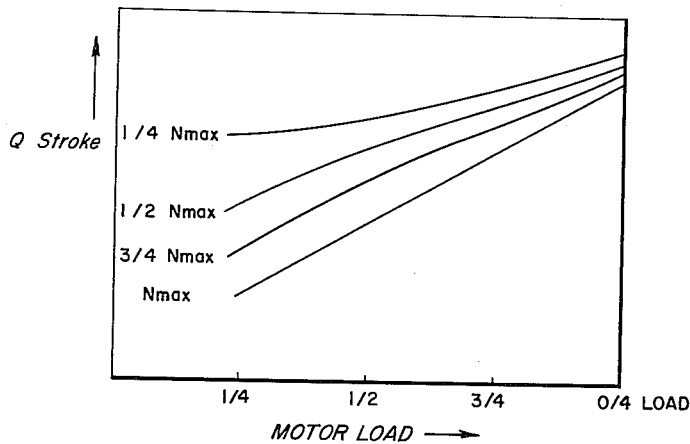
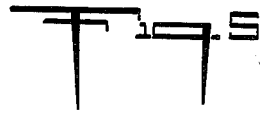
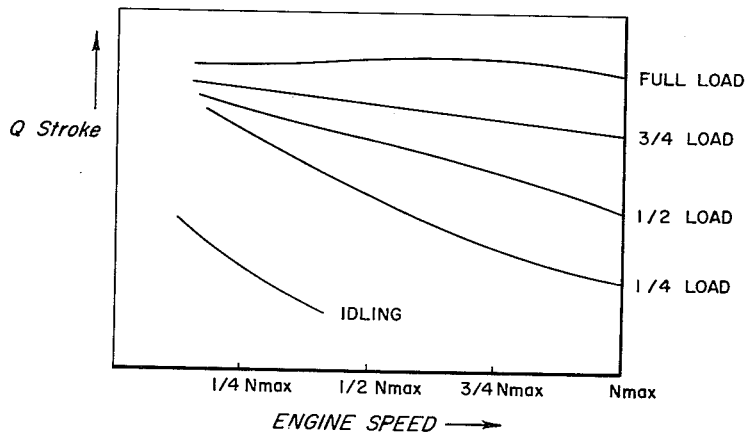
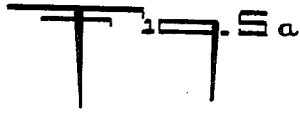

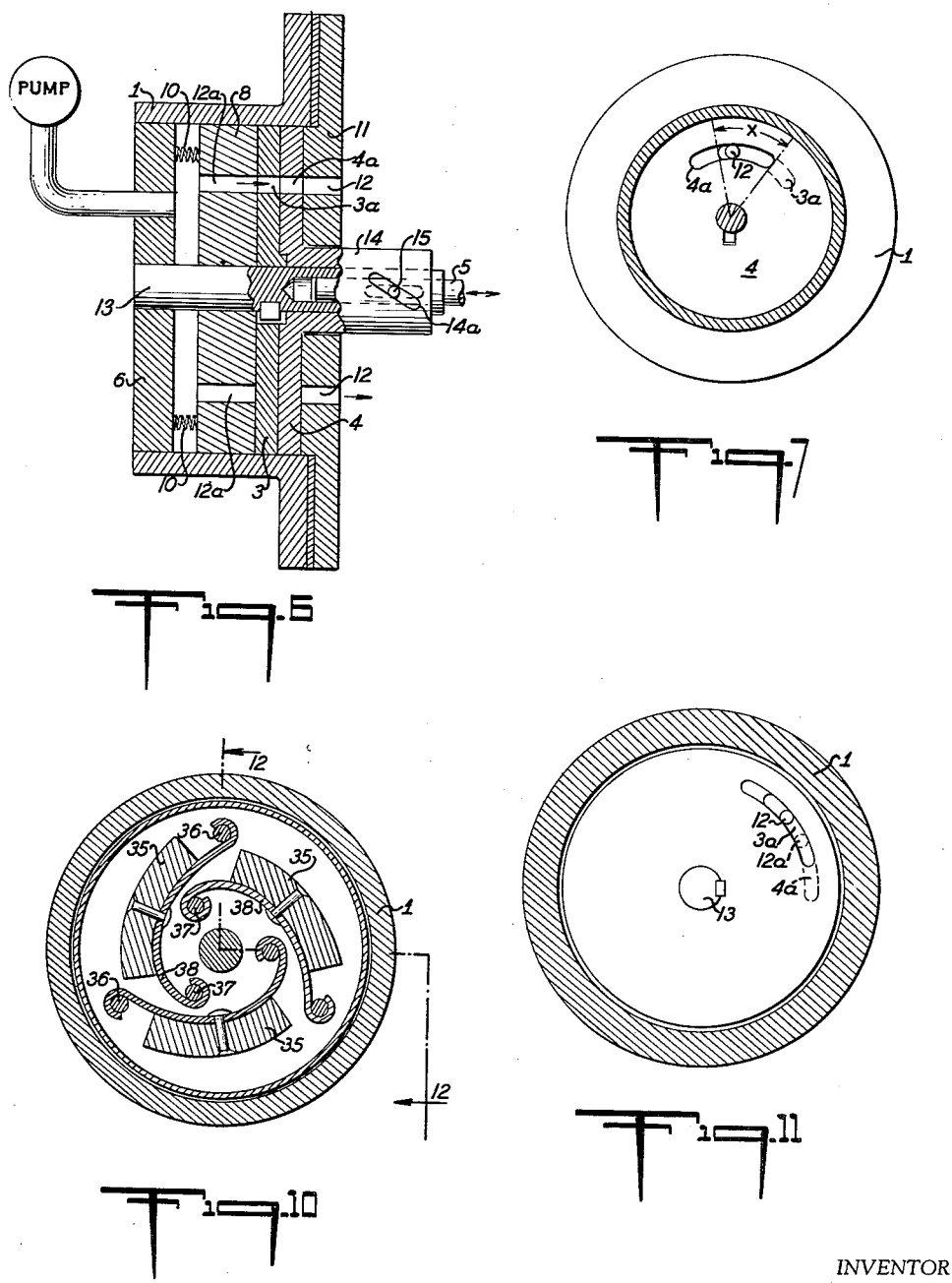

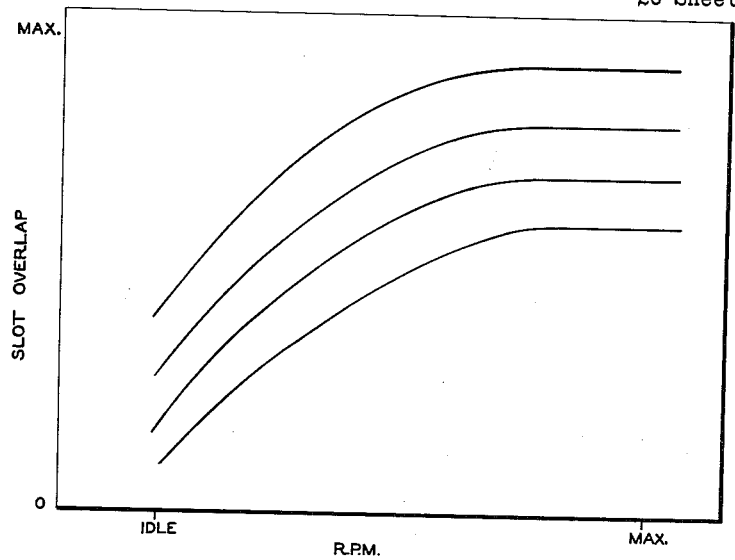
DISTRIBUTOR SLOT OVERLAP
REQUIRED BY ENGINE FUEL
REQUIREMENTS
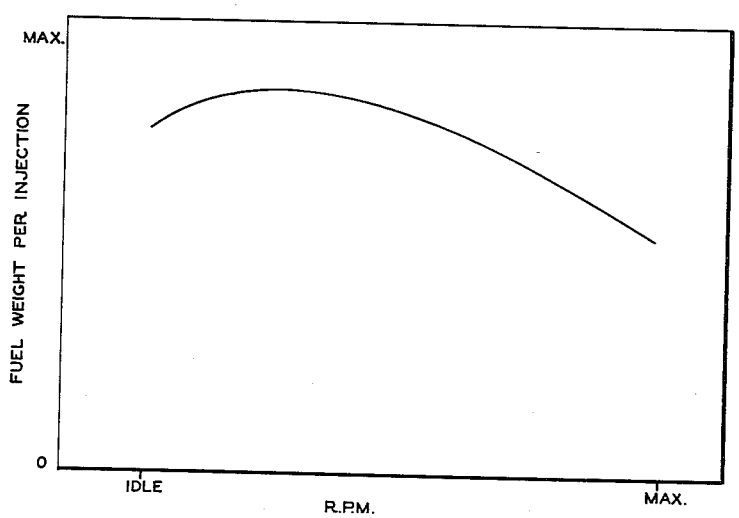
DISTRIBUTOR DELIVERY AT CONSTANT
PRESSURE WITH ONLY VARIATION OF
SLOT OVERLAP OCCURRING
INVENTOR
FRITZ A. F. SCHMIDT

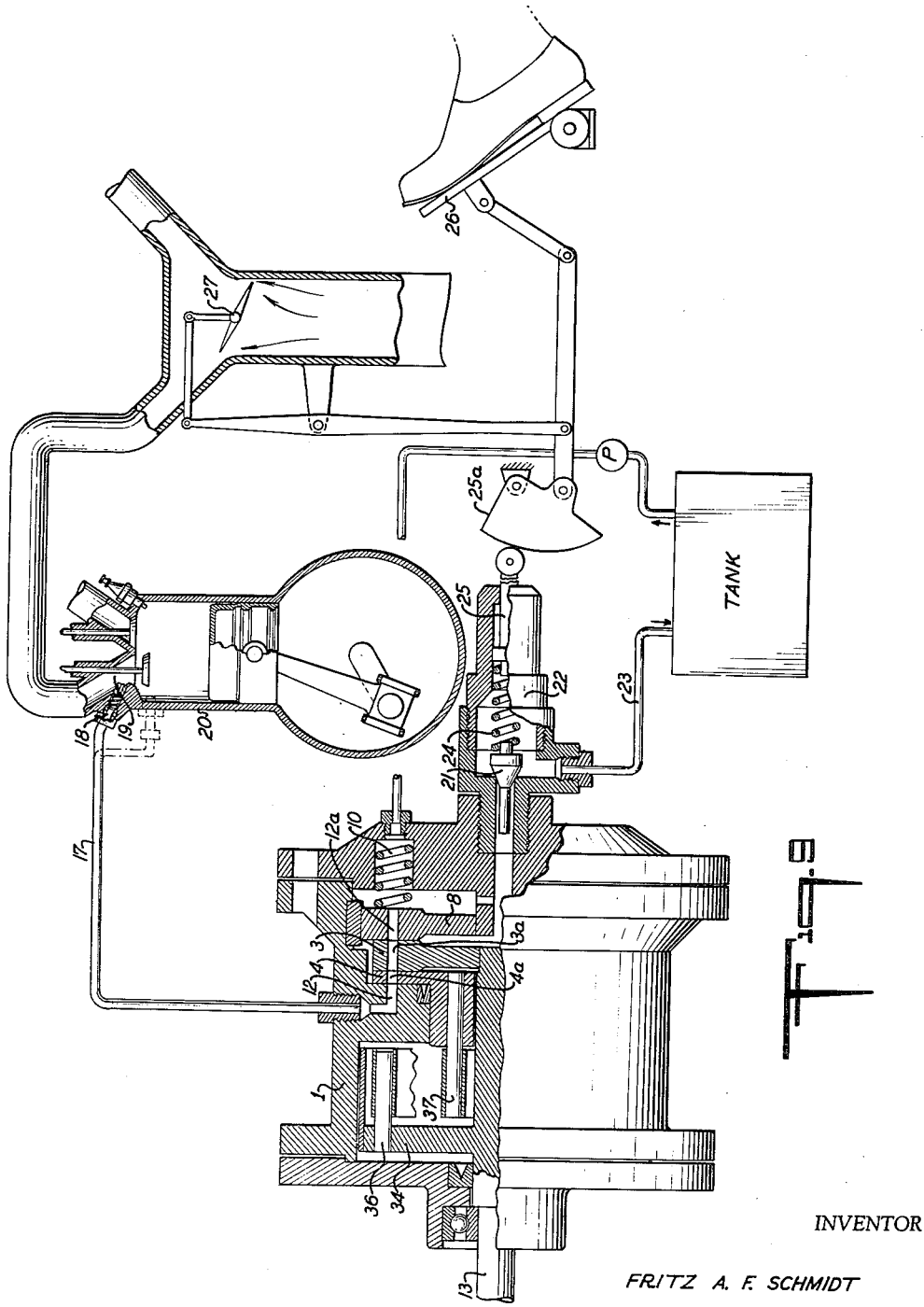

Sept. 18, 1962 F. A. F. SCHMIDT 3,054,393
FUEL INJECTION SYSTEM
Filed Feb. 4, 1958 20 Sheets-Sheet 8
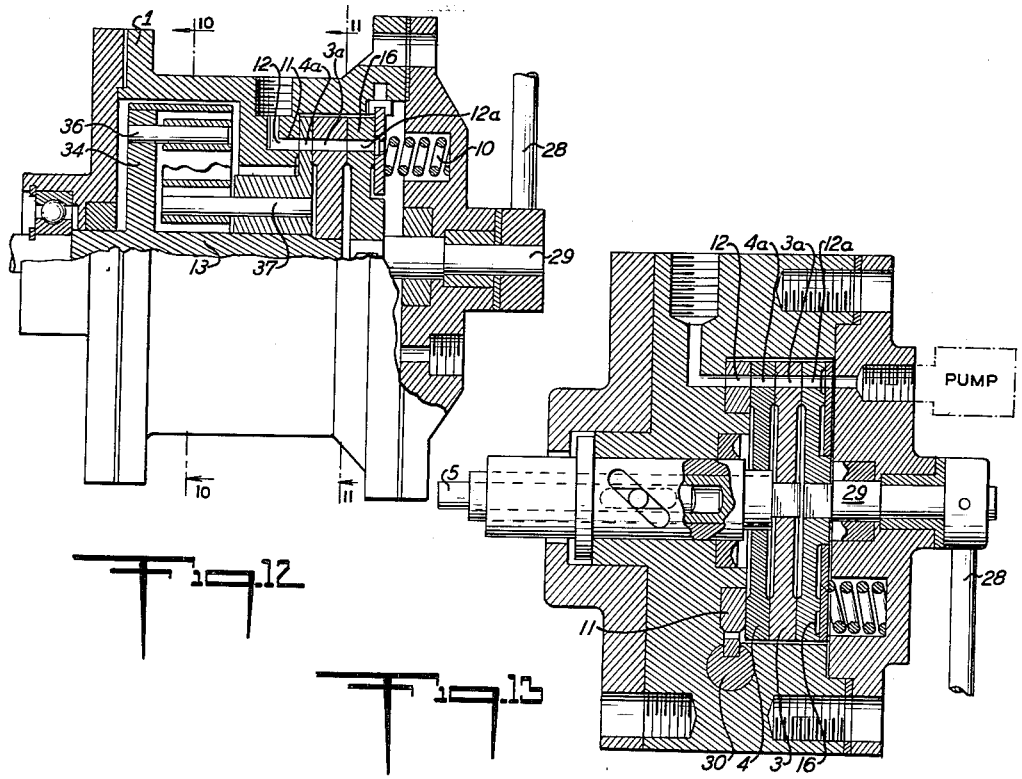
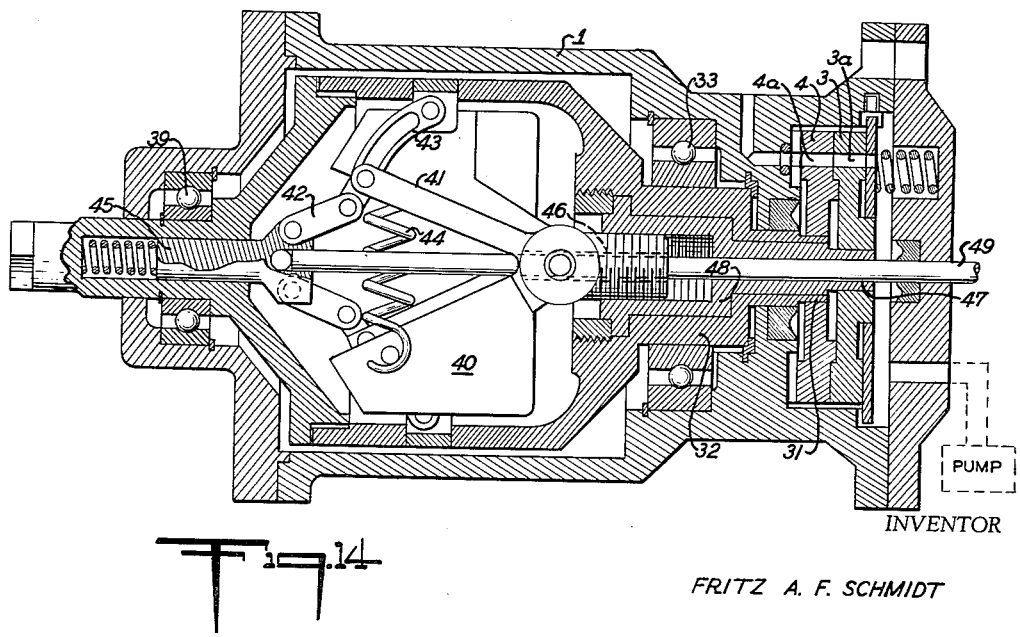
INVENTOR
FRITZ A. F. SCHMIDT
BY Burgess, Dinklage & Sprung
ATTORNEYS

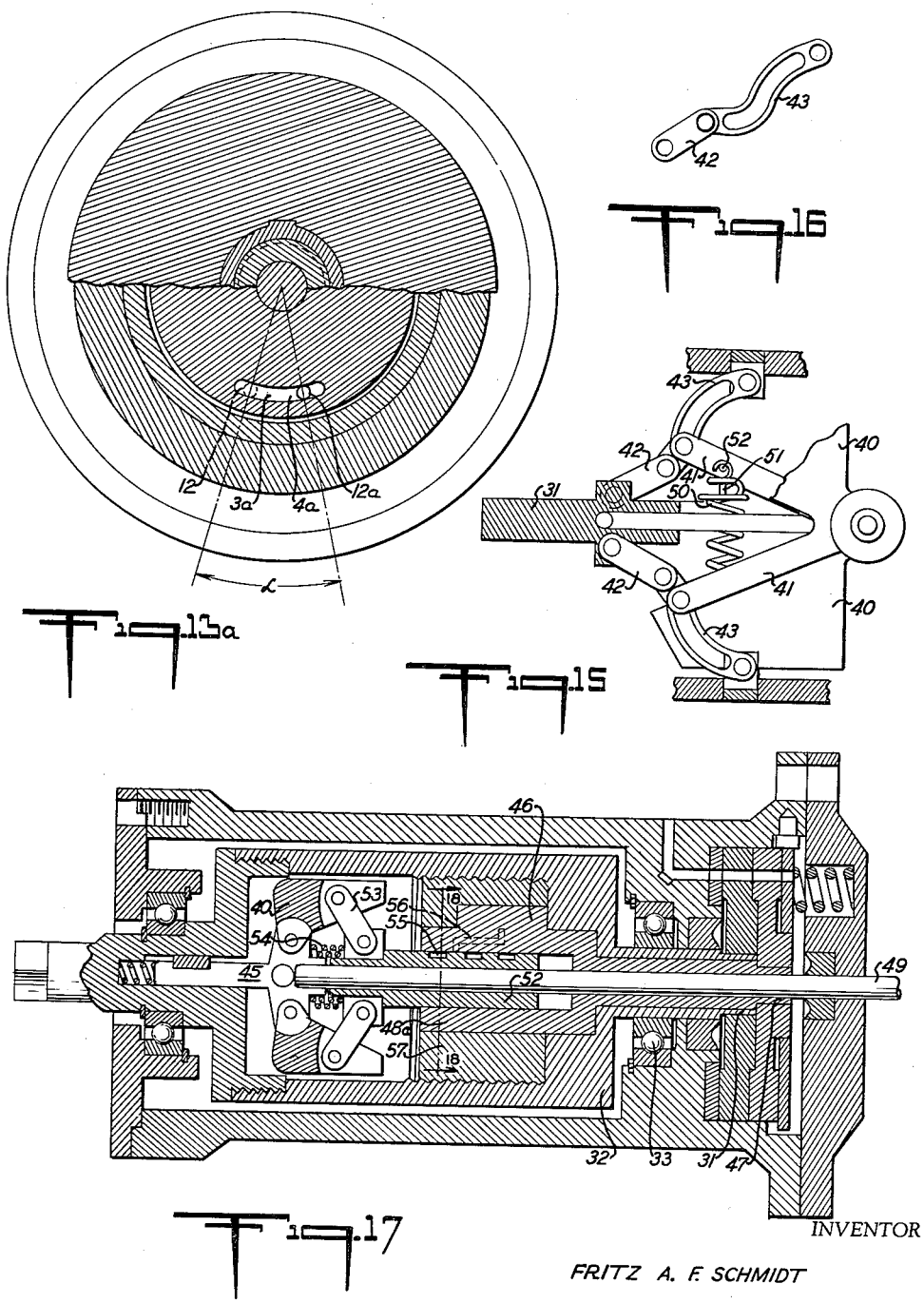

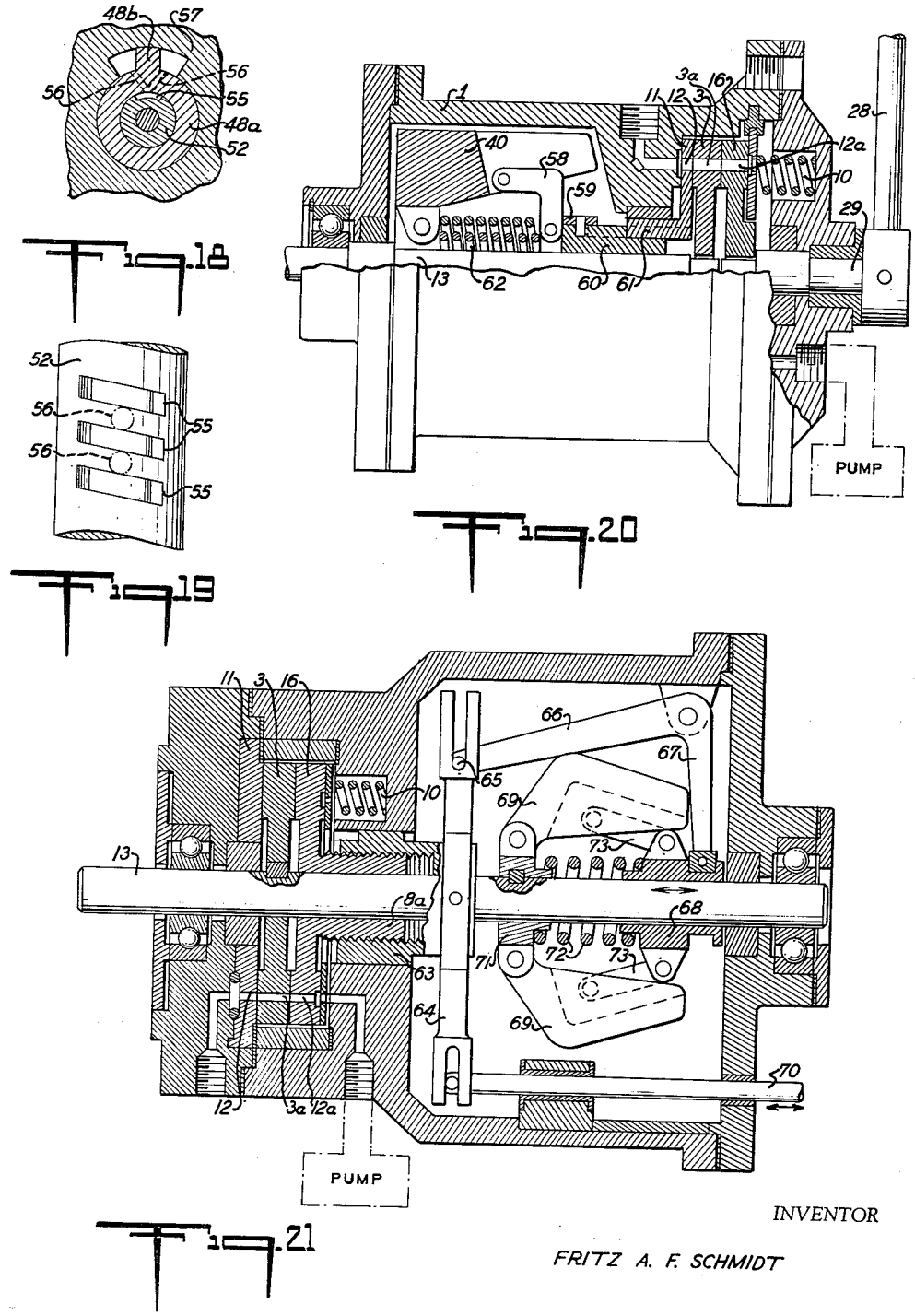

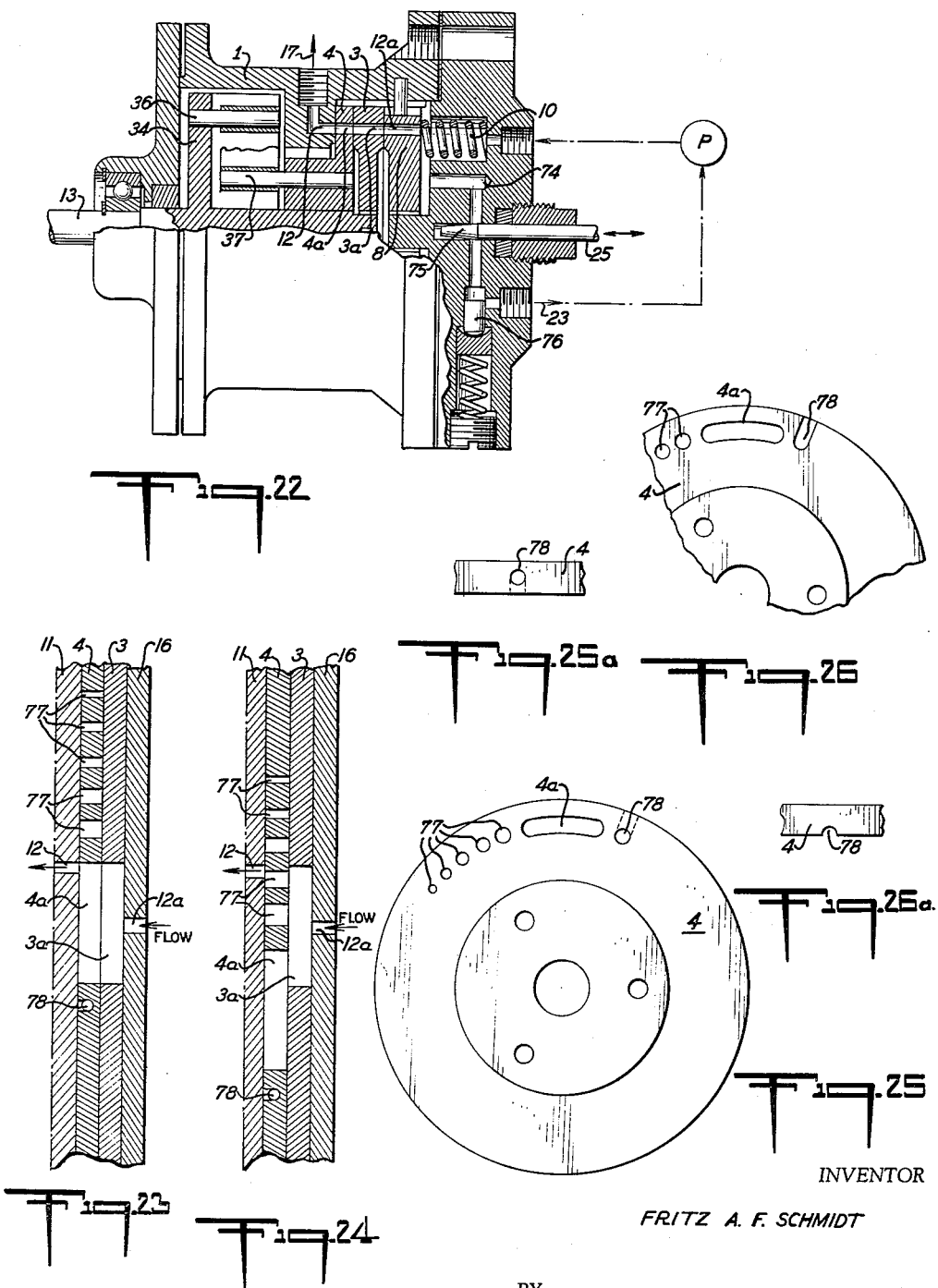

Sept. 18, 1962 F. A. F. SCHMIDT 3,054,393
FUEL INJECTION SYSTEM
Filed Feb. 4, 1958 20 Sheets-Sheet 12
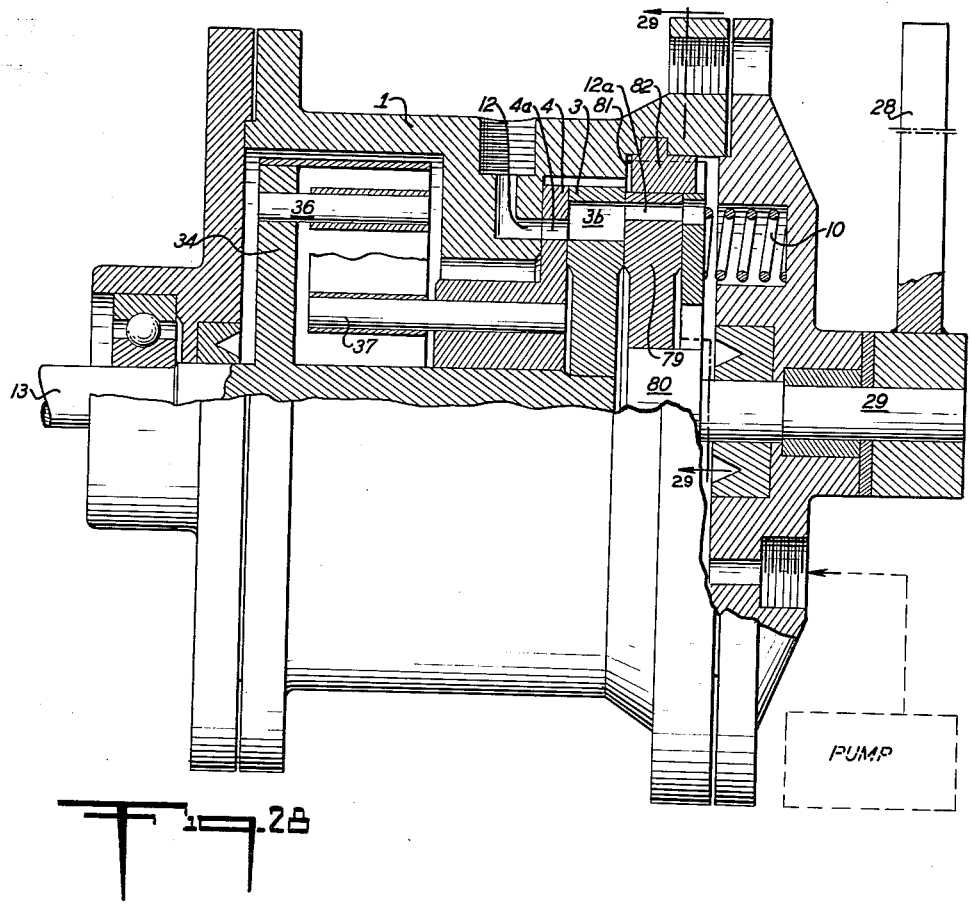
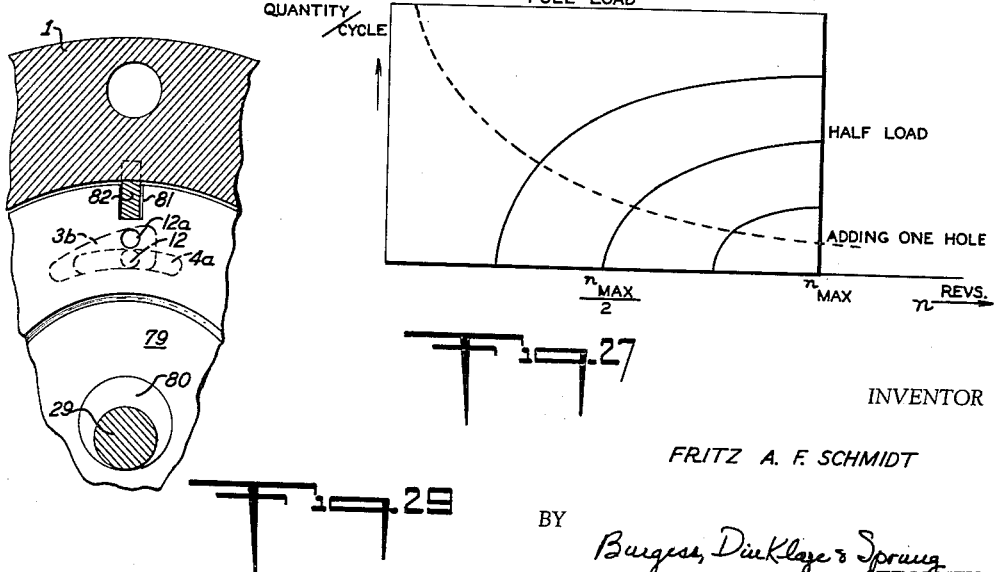
INVENTOR
FRITZ A. F. SCHMIDT
BY Burgess, DinKlage & Sprung
ATTORNEYS

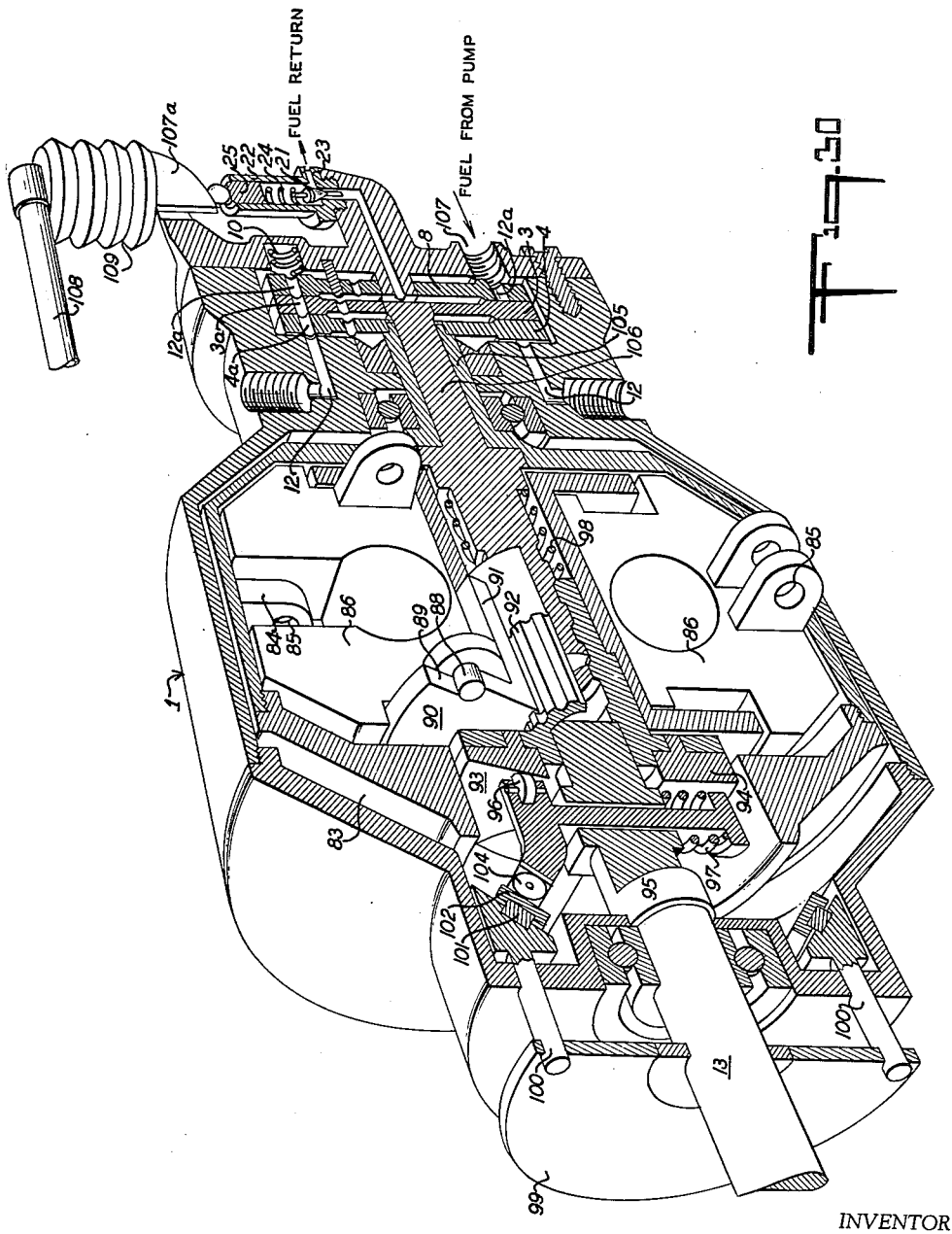

Sept. 18, 1962 F. A. F. SCHMIDT 3,054,393
FUEL INJECTION SYSTEM
Filed Feb. 4, 1958 20 Sheets-Sheet 14
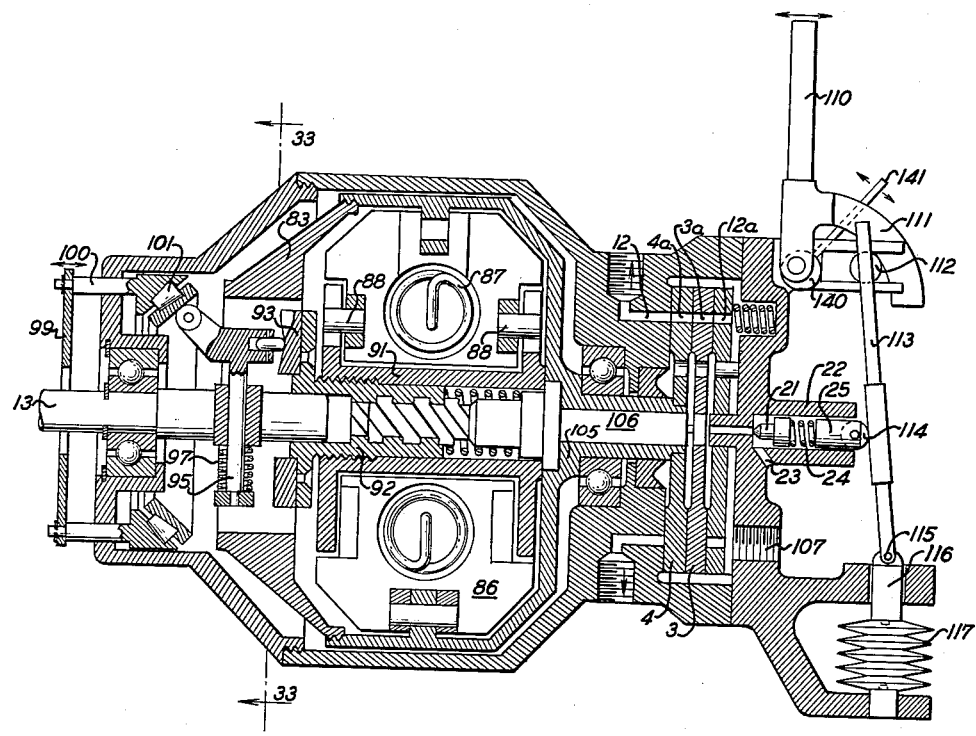
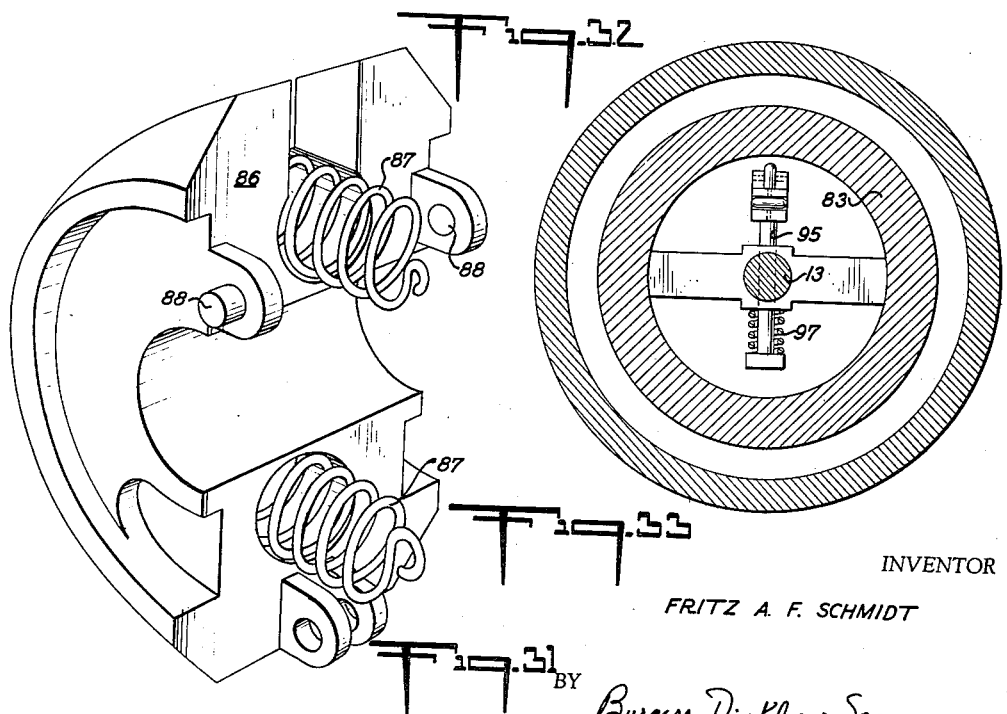
INVENTOR
FRITZ A. F. SCHMIDT
BY Burgess, Dinklage & Sprung
ATTORNEYS Sept. 18, 1962  F. A. F. SCHMIDT  3,054,393
FUEL INJECTION SYSTEM
Filed Feb. 4, 1958  20 Sheets-Sheet 15

INVENTOR
FRITZ A. F. SCHMIDT
BY Burgess, Dinklage & Sprung
ATTORNEYS

INVENTOR
FRITZ A. F. SCHMIDT

Sept. 18, 1962  F. A. F. SCHMIDT  3,054,393
FUEL INJECTION SYSTEM
Filed Feb. 4, 1958  20 Sheets-Sheet 17
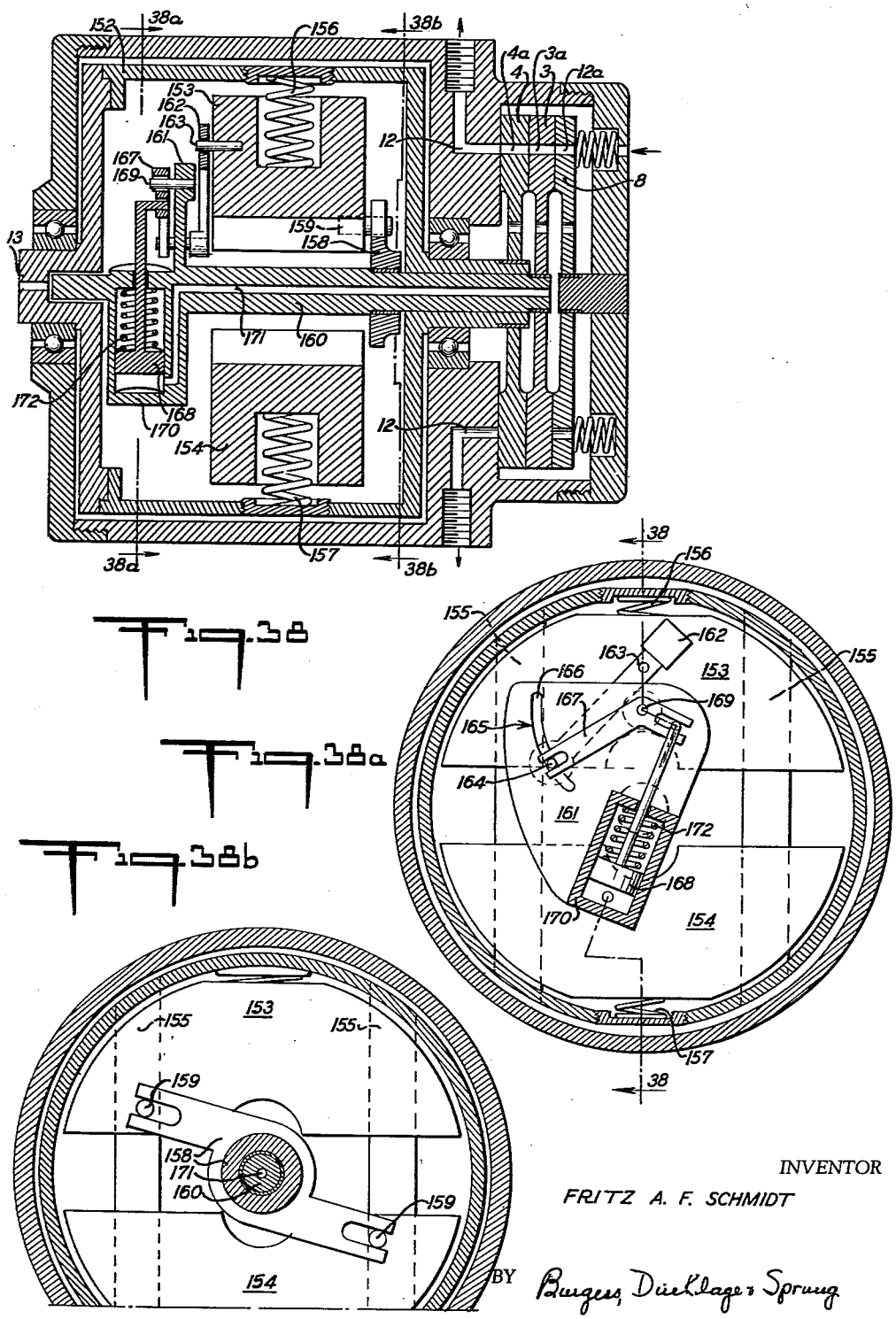
INVENTOR
FRITZ A. F. SCHMIDT
BY Burgess, Dinklage & Sprung
ATTORNEYS

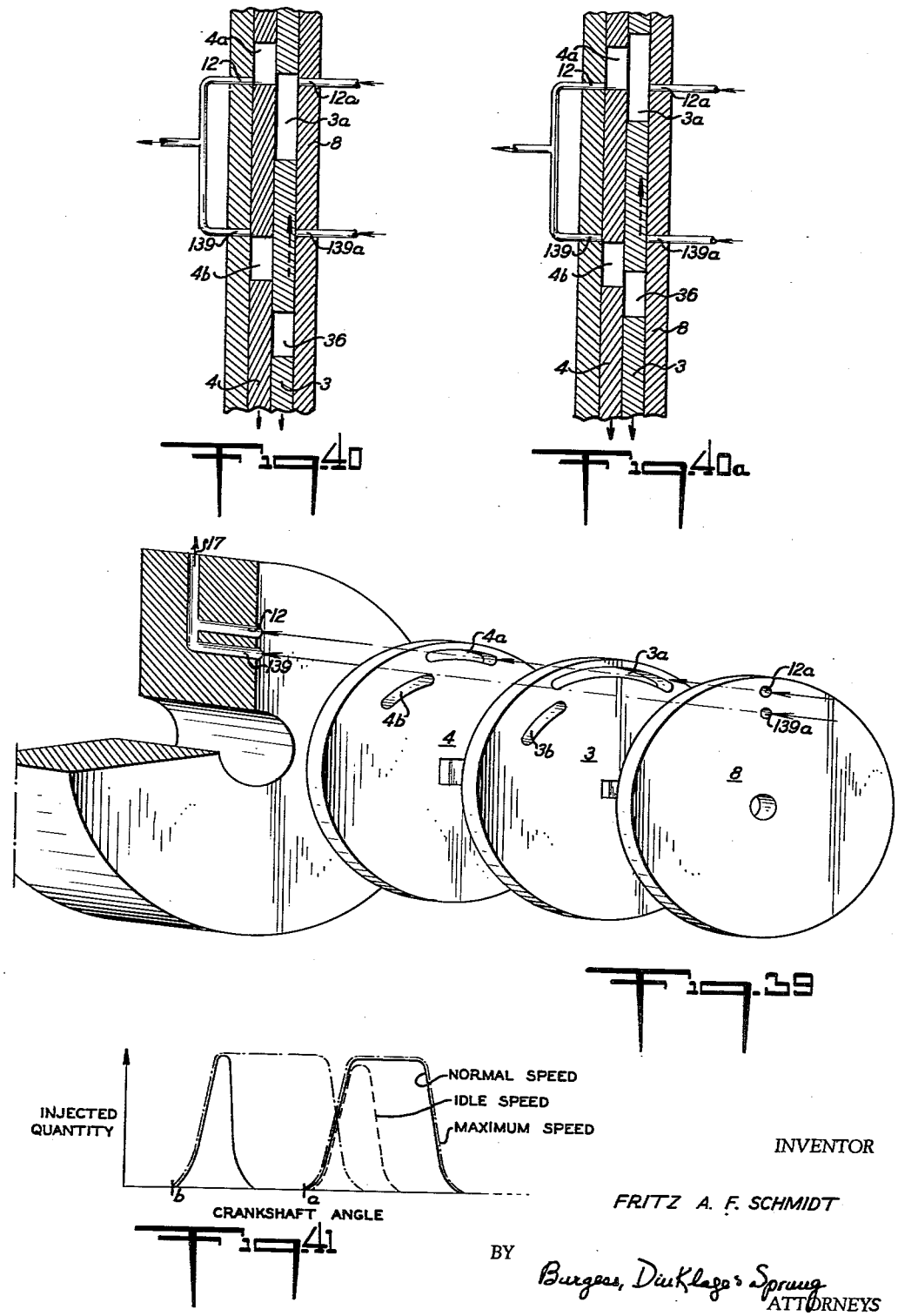

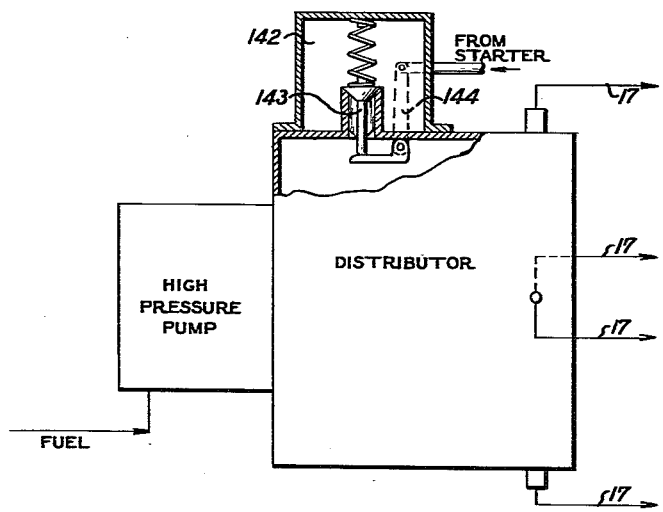
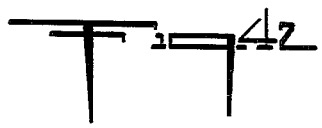
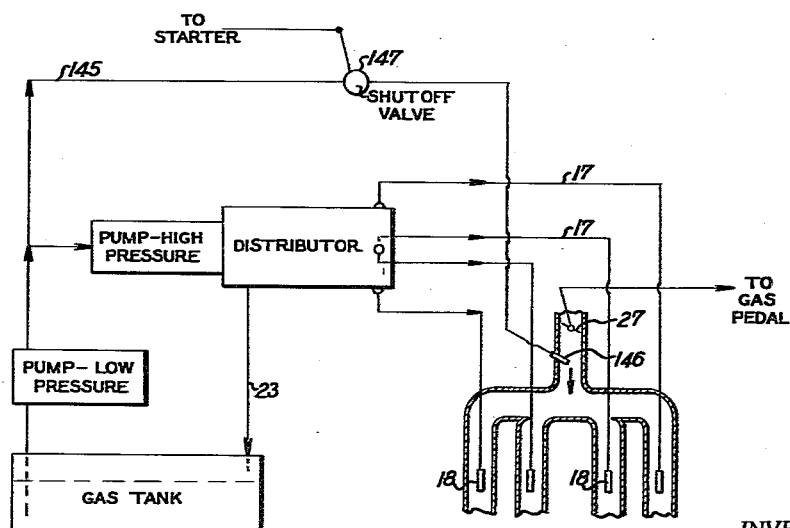

Sept. 18, 1962   F. A. F. SCHMIDT   3,054,393
FUEL INJECTION SYSTEM
Filed Feb. 4, 1958   20 Sheets-Sheet 20
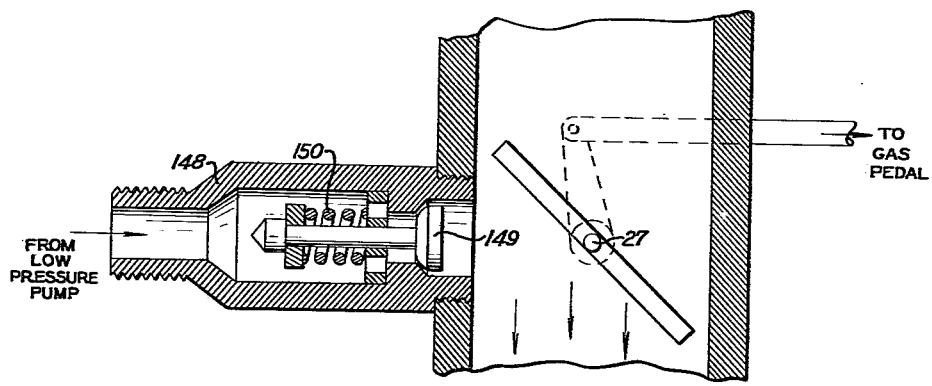
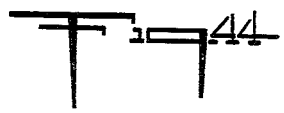
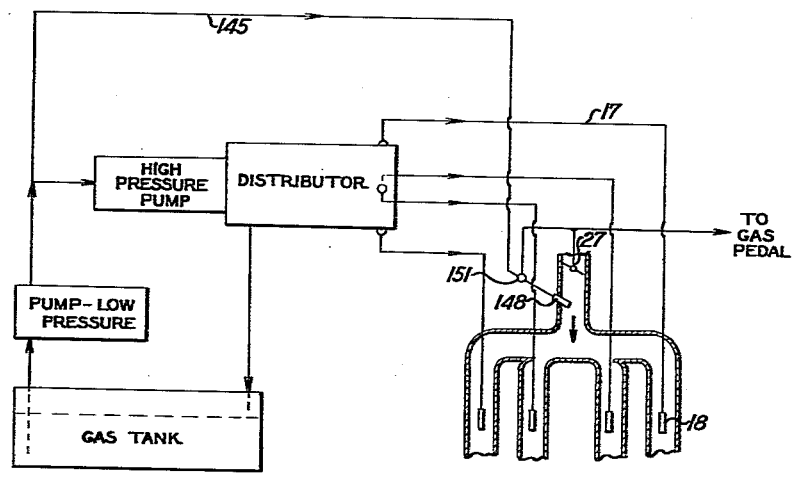
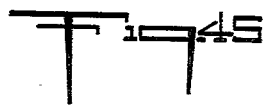
INVENTOR
FRITZ A. F. SCHMIDT
BY *Burgess, Dinklage & Sprung*
ATTORNEYS

United States Patent Office 3,054,393
Patented Sept. 18, 1962

3,054,393
FUEL INJECTION SYSTEM
Fritz A. F. Schmidt, Dr. Seitz, Strasse 33K, Murnau,
Upper Bavaria, Germany
Filed Feb. 4, 1958, Ser. No. 713,184
Claims priority, application Germany July 27, 1954
35 Claims. (Cl. 123—139)

The present invention relates to a fuel injection system and is a continuation-in-part and consolidation of my co-pending applications Serial No. 519,538, filed July 1, 1955, Serial No. 663,542, filed June 9, 1957, and co-pending application, Serial No. 431,957, filed May 24, 1954, which in turn is a continuation-in-part of application, Serial No. 332,678, filed January 22, 1953, all of which are now abandoned.

The present invention more particularly relates to a fuel injection system for a 4 or 2-cycle ignition type internal combustion engine, as for example, an automotive type internal combustion engine and to a fuel distributor and metering device.

In internal combustion engines in which the ignition event is initiated by an electrical spark, the ratio of air to fuel in the cylinder is extremely critical. If this air to fuel ratio varies widely from the ideal ratio of roughly 15:1, the spark will be ineffective in initiating the combustion in the cylinders. For this reason, carburetors have generally been used to meter the fuel to the cylinders in ignition engines. In the carburetor the air flow through the venturi neck determines the amount of fuel drawn in so that the air fuel ratio may be maintained within the limits suitable for ignition by the spark.

The fuel requirements of an engine vary with the operating conditions such as speed, load, temperature, altitude, acceleration, etc., and as every carburetor expert knows, the carburetor will at best only very roughly satisfy the fuel metering requirements of the engine under these various operating conditions. The carburetor is generally relatively inefficient from a fuel economy standpoint, causing discharge by the engine of unburnt fuel and carbon monoxide creating an air pollution problem and is relatively sluggish in fuel metering response to changes in throttle position and operating conditions.

Additionally, with a carburetor, a more or less heterogeneous mixture of the fuel and air must be carried along the intake manifold to the intake valves or ports of the individual cylinders. The transportation of this mixture to the cylinders with a minimum of fuel separation requires the use of relatively high flow velocities in the manifolds which can only be effected with the use of relatively small passages and additionally requires the use of heat for further fuel vaporization. This transportation of the fuel-air mixture to the cylinders does not insure an absolutely uniform distribution of the fuel to the various cylinders and generally some of the cylinders will tend to run leaner than others so that the mixture has to be richened at the carburetor to insure adequate fuel for the leaner cylinders.

Cold starting and warming up of the engine generally requires a substantially increased amount of fuel to provide for the initial wetting of the manifold while still insuring adequate liquid and vaporized fuel for firing which further detracts from the fuel economy and further increases the air pollution. Additionally, as the throttle is opened a decrease in the manifold vacuum occurs increasing the manifold wetting so that a further quantity of fuel is required, which is generally supplied by an accelerator pump.

As the overall response of the carburetor to changes in throttle and engine conditions is not instantaneous, the engine feel is generally not smooth during this transition. The heating of the manifold for the additional vaporization often results in loss of fuel from the carburetor and through evaporation, promotes vaporlock, and cause some octane depreciation of the fuel due to an increase in the mixing temperature.

In spite of the fact of these known deficiencies and in spite of the knowledge that the correction of even a portion thereof could substantially increase the fuel economy and engine performance, the carburetor has remained the primary fuel metering device in connection with ignition type engines.

While fuel injection systems were known in connection with diesel engines, the problems and design factors in connection with diesel engines are substantially different than those in connection with ignition type engines. The injection timing in connection with ignition type reciprocating engines is not at all critical and may be theoretically effected at any time during the intake and compression stroke. In diesel engines, on the other hand, the injection timing is extremely critical as the same determines the point of the ignition event. In diesel engines, the injection must be effected directly into the cylinder and generally against the relatively high pressure developed by these engines on the compression stroke. In ignition type engines, the injection may either be effected directly in the cylinder or at the air intake port and as the same may be effected on the intake stroke these high pressures are not required.

While the air to fuel ratio is extremely critical in ignition type engines for the ignition event, this criticality does not exist in connection with diesel engines. In diesel engines control of the engine speed under various load conditions is merely effected by varying the quantity of fuel injected independent of the air flow to the cylinders. The diesel injection systems generally, therefore, would not be suitable for ignition type engines and even if the possibility existed of adapting the same, their cost would be prohibitive in connection with most ignition type internal combustion engine applications, as, for example, in the automotive fields.

In certain ignition engine fields, and in particular in connection with aircraft engines, carburetion presented many special difficulties, as, for example, the fuel distribution problem in connection with radial air cooled engines and fire and explosion hazard in the manifold and super-chargers of radial and V-type aircraft engines. In order to overcome these special problems, and to avoid the additional difficulties, in carburetor operation over a wide altitude range, an injection system was developed, incorporating a diesel type injection pump. This injection system operated satisfactorily over the rather narrow cruising and full power range of the aircraft engine. The same, however, was not at all suitable in the majority of other ignition type internal combustion engines in view of their wider operational range from idle to full speed and from a cost standpoint. The use of individual plungers for each cylinder, for example, did not prove satisfactory in connection with automotive engines over their wide operational range, as, for example, at idle and in traffic operation.

Various fuel injection systems were designed for automotive type engines in attempts to overcome the shortcomings of the carburetor. These includes injection systems having solenoid operated injection nozzle valves for each cylinder which were operated by an electronic control device and injection systems having continuous flow nozzles for each cylinder. In all these injection systems, in view of the critical ratio of air to fuel required for the ignition event, the flow of air to the cylinders is always measured in some manner and the measurement utilized for controlling the injection amount. This was done, for example, by means of a venturi for a mass flow metering or by manifold pressure measurement for a speed density metering. With the means used for measuring this air flow to the cylinders, many of the carburetor errors would reappear in the fuel injection system as the carburetor operation also in effect depends upon an air flow measurement.

Additionally, the electronically controlled solenoid valves presented operational difficulties with respect to accuracy and maintenance and a continuous flow system presented a serious problem with respect to injection nozzle matching.

One object of the present invention is a novel fuel injection system excellently suited for an automotive type internal combustion engine which overcomes the disadvantages encountered in carburetor systems and the prior art fuel injection system.

A further object of the present invention is a fuel injection system for an ignition type internal combustion engine which may be operated without a measurement of the air flow to the cylinders for fuel metering during actual engine operation.

A still further object of the present invention is a novel distributor construction which is excellently suited for the fuel injection system in accordance with the invention, but which may be used in connection with other fuel injection systems including diesel systems; for machine tool operation; jet drives; turbines, or the like.

With these and other objects in view which will become apparent in the following detailed description, the present invention will be clearly understood in conjunction with the accompanying drawings, in which:

FIGURE 1 is a curve plotting the brake specific fuel consumption against the brake horsepower for various throttle positions, at a given speed, for a typical engine, the values given being more or less arbitrary, and not representing a specific engine;

FIG. 2 is a three dimensional curve showing a multiple group of curves corresponding to FIG. 1, for various speed ranges;

FIG. 3 is a typical curve showing the general relationship between the power output of the engine, the brake specific fuel consumption and various air-fuel ratio mixtures for a typical engine;

FIG. 4 is a typical over all performance curve for an engine indicating the best air-fuel ratios for various operating conditions;

FIG. 5 is a curve plotting fuel weight per injection against throttle or foot feed position at various speeds and showing the ideal engine fuel requirements for a typical engine;

FIG. 5a is a curve plotting the fuel weight per injection against the engine speed at various throttle positions, and showing the ideal engine fuel requirements for a typical engine;

FIG. 6 is a diagrammatic vertical section showing an embodiment of a distributing device, in accordance with the present invention;

FIG. 7 is a cross-section of FIG. 6;

FIG. 8 is a curve plotting the slot overlap with a distributor of the type of FIG. 6, against the speed at various throttle positions, corresponding to various different fuel pressures;

FIG. 8a is a curve plotting the fuel weight per injection against the speed at a constant pressure and with only a variation in the slot overlap with a distributor of the type shown in FIG. 6;

FIG. 9 is a side elevation partially in section, showing an embodiment of a distributing device, in accordance with the present invention and diagrammatically showing the same connected as a component part of a fuel injection system in accordance with the present invention;

FIGS. 10 and 11 are cross sections of the distributing device shown in FIG. 9;

FIG. 12 is a side elevation partially in section, of a further embodiment of a distributing device, in accordance with the present invention;

FIG. 13 is a vertical section of still a further embodiment of a distributing device, in accordance with the present invention;

FIG. 13a is a diagrammatic cross-section of the embodiment of FIG. 13;

FIG. 14 is a vertical section of a still further embodiment of a distributing device, in accordance with the present invention;

FIG. 15 is a detailed side elevation showing a variant in the structure of the fly weights connecting linkage of the embodiment shown in FIG. 14;

FIG. 16 is a detailed view showing a further varient of a slot in a connecting linkage of the fly weights of the embodiment shown in FIG. 14

FIG. 17 is a vertical section of a further embodiment of a distributor in accordance with the present invention, with a hydraulic control;

FIG. 18 is a partial cross-section of the embodiment shown in FIG. 17;

FIG. 19 is a diagrammatic elevation of a portion of the piston of a device shown in FIGS. 17 and 18;

FIG. 20 is a side elevation, partially in section, of a further embodiment of the distributing device, in accordance with the present invention;

FIG. 21 is a vertical section of a still further embodiment of the distributing device, in accordance with the present invention;

FIG. 22 is a side elevation, partially in section, of a still further embodiment of a distributing device, in accordance with the present invention;

FIG. 23 is a diagrammatic section along a radius through an embodiment of rotating distributing discs in accordance with the present invention;

Figure 34:
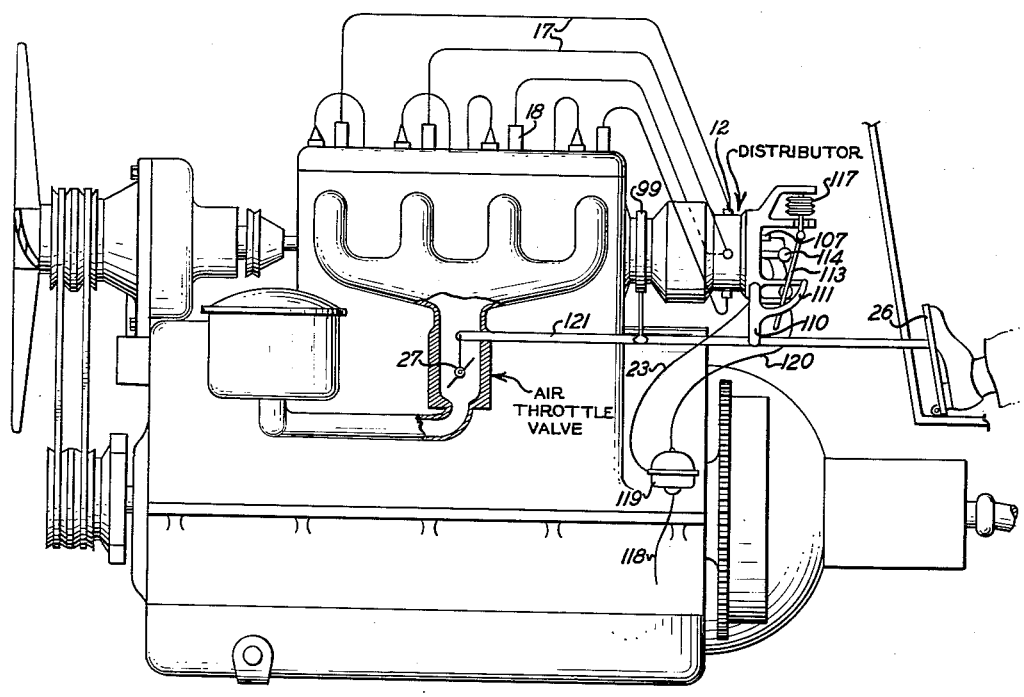
Figure 36:
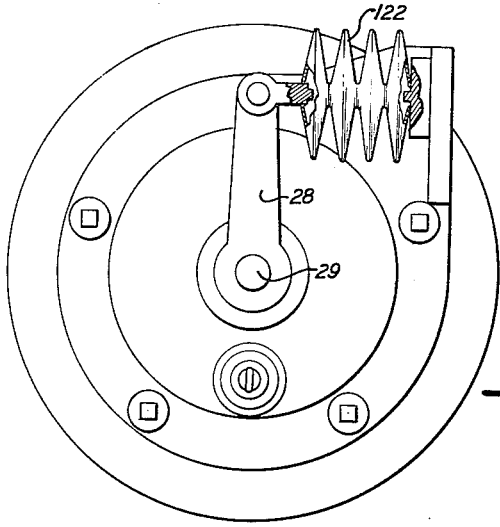
Figure 37A:
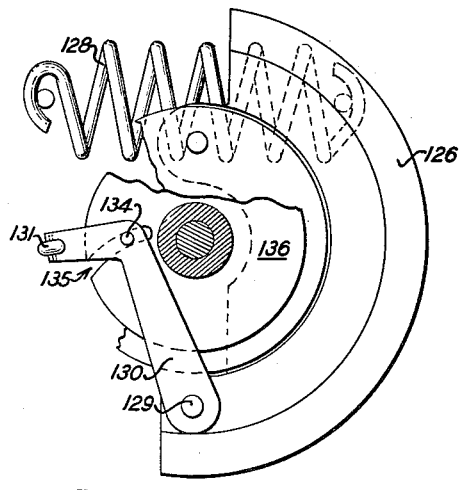
Figure 35:
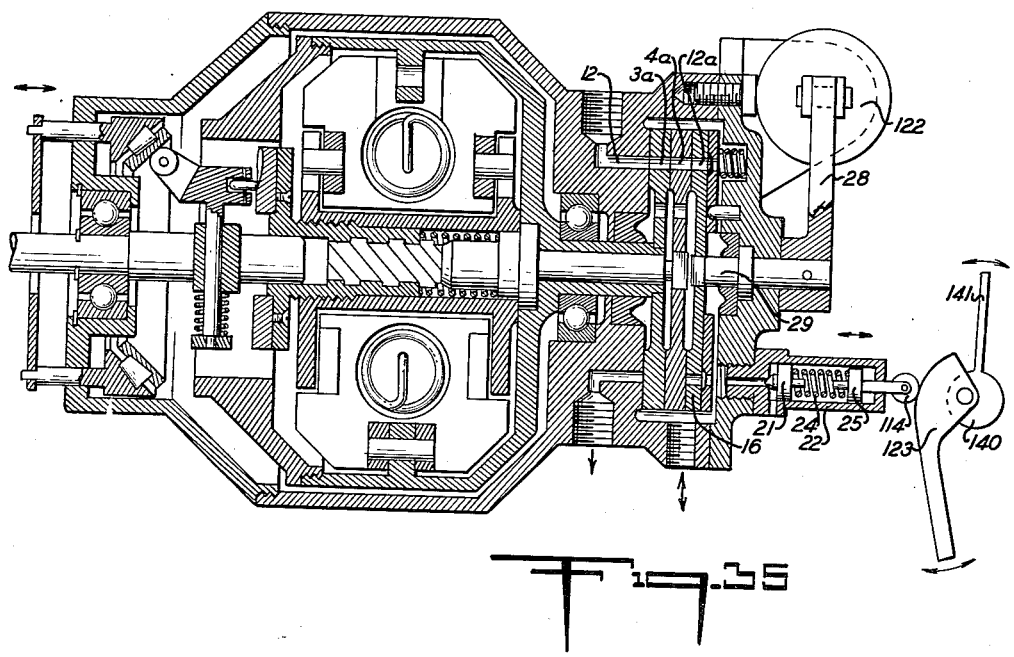
Figure 37:
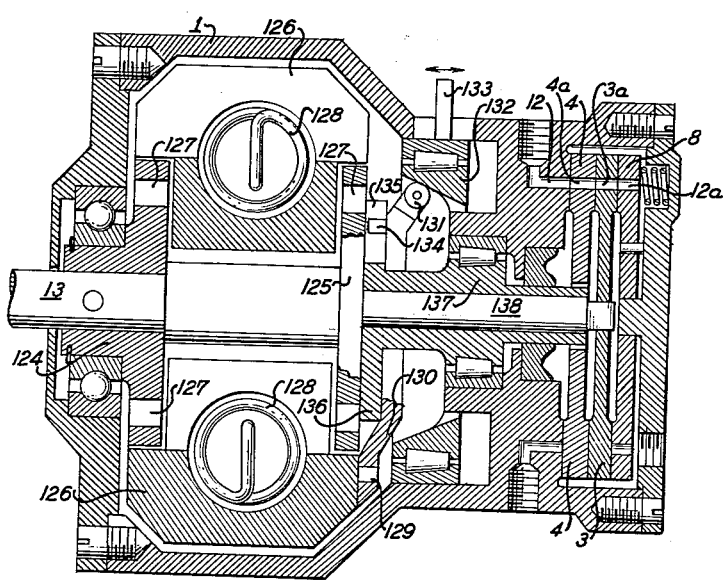

FIG. 24 corresponds to FIG. 23, in a different position of operation;

FIG. 25 is a front elevation of the embodiments shown in FIGS. 23 and 24;

FIG. 25a is a partial side elevation of FIG. 25;

FIG. 26 is a partial front elevation of a further embodiment of a distributing disc, in accordance with the present invention;

FIG. 26a is a partial side elevation of the distributing disc shown in FIG. 26;

FIG. 27 is a curve plotting the quantity of fuel injected per cycle against the speed for distributing discs having the construction of FIGS. 23 through 26;

FIG. 28 is a side elevation, partially in section, of a still further embodiment of the distributing device, in accordance with the present invention;

FIG. 29 is a partial cross-section of the device shown in FIG. 28;

FIG. 30 is a perspective view in vertical section of a still further embodiment of the distributing device, in accordance with the present invention, provided with a three dimensional cam;

FIG. 31 is a perspective view of one of the fly weights of the embodiment of FIG. 30;

FIG. 32 is a vertical section of a still further embodiment of the distributing device, in accordance with the present invention;

FIG. 33 is a partial cross-section through FIG. 32;

FIG. 34 shows the distributing device of FIG. 32, in position on a four cylinder internal combustion engine as a component part of the fuel injection system;

FIG. 35 is a vertical section of a still further embodiment of a distributing device, in accordance with the present invention;

FIG. 36 is a partial front elevation of the device shown in FIG. 35;

FIG. 37 is a diagrammatic vertical section of a still further embodiment of a distributing device, in accordance with the present invention;

FIG. 37a is a partial cross-section of the embodiment shown in FIG. 37;

FIG. 38 is a diagrammatic vertical section of a still further embodiment of a distributing device in accordance with the present invention;

FIGS. 38a and 38b are cross-sections of the embodiment shown in FIG. 38;

FIG. 39 is a diagrammatic perspective exploded view, partially in section, showing an embodiment of the distributing disc, in accordance with the present invention;

FIG. 40 is a diagrammatic section along a radial line, showing the distributing disc of FIG. 39 in one position of operation;

FIG. 40a corresponds to FIG. 40, in another position of operation;

FIG. 41 is a curve plotting the injected quantity of fuel against the crank shaft angle of the engine for the embodiment shown in FIG. 39;

FIG. 42 is a diagrammatic side elevation, partially in section, of an embodiment of a distributing device with a quick starting device;

FIG. 43 diagrammatically shows the connection of an embodiment of a quick starting device, in accordance with the present invention and the fuel injection system of an internal combustion engine;

FIG. 44 diagrammatically shows a vertical section of an air inlet to an intake manifold of an engine, with an injection nozzle for uniform idling;

FIG. 45 diagrammatically shows a connection of a uniform idling device to a fuel injection system, in accordance with the present invention; and If any ignition type internal combustion engine is run on a test stand with a fuel air mixing device which is adjustable with respect to the fuel quantity, the characteristics at various throttle positions at a given constant speed, with various fuel quantities may be plotted on a graph. If the actual brakehorsepower of the engine is plotted on the horizontal axis against the brake specific fuel consumption on the vertical axis, at each constant speed over the engine range, a fish-hook shape curve may be obtained for each throttle position.

Referring now to the drawings, and in particular to FIG. 1, a typical example of such a curve is given, which is plotted at a constant speed of 2500 r.p.m. for ¼, ½, ¾ and full throttle positions with fuel variations for each throttle position over the entire range of operation. The brake specific fuel consumption indicated on the ordinate indicates the number of pounds of fuel consumed per horsepower hour and the brakehorsepower on the abscissa is set forth as brakehorsepower units.

For each throttle position the engine is run at the constant speed indicated varying the fuel quantity over the maximum possible combustible range of the air fuel mixture, i.e., from the leanest fuel mixture at which the engine will run at this speed and throttle position to the richest mixture at which the engine will run at the speed and throttle position. The points plotted for each throttle position will form the fish-hook shaped curves shown. The points at the upper end of these fish-hook curves represent the operating conditions for the rich mixture while the points at the lower end represent the operating conditions for the lean mixture. As may be noted from each fish-hook curve, as the mixture is leaned from its maximum value, the power output of the engine gradually increases reaching a maximum point. This point in each fish-hook curve, i.e., the point furthest to the right on the curve, represent the fuel mixture for maximum power. As the mixture is further leaned, the power gradually decreases reaching a point at the bottom of the fish-hooked curve after which the same rapidly decreases. The point at the lower end of the fish-hooked curve represents the point of maximum fuel economy, i.e., minimum fuel consumption. Iso-injection lines, i.e., lines representing the actual quantity of fuel injected in, for example, mg. per or fractions of a pound per injection may be also plotted on the graph. In order to obtain the value of the fuel quantity injected in fractions of a pound per injection of the iso-injection line, the brakehorsepower may be multiplied by the brake specific fuel consumption and divided by the strokes or injections per hour.

A number of curves corresponding to the curve of FIG. 1 may be drawn for the engine over a number of speeds representative of the entire speed operational range of the engine. If these various curves for the various speed ranges are placed side by side, an overall air fuel ratio engine performance three dimensional curve for the particular engine type will be obtained as shown in FIG. 2.

The theoretical air fuel ratio is about 15:1. The ratio of the actual mixture to this theoretical mixture may be represented by the symbol "lambda." When the actual mixture equals the theoretical mixture "lambda" is 1. When the mixture is too rich "lambda" will be less than 1, and when too lean "lambda" will be greater than 1.

As every skilled artisan knows from experience and understanding of engine operation, the air fuel ratios should vary with different load speed combinations. Thus, for example, at idle a richer mixture should be used. Furthermore, under high load conditions such as when accelerating or when hill climbing at fairly wide open throttle and relatively low engine speeds, richer mixtures should be used to obtain the maximum engine power. Additionally, in the higher speed range, rich mixtures should be used in order to obtain the maximum power output of the engine.

The general relationship between the power output of the engine, the brake specific fuel consumption and various air fuel ratio mixtures is shown in the graph of FIG. 3. As may be noted, the maximum power at a relatively high fuel consumption is obtained with a rich mixture, as, for example, a "lambda" value of about 0.85. The maximum fuel economy, i.e., minimum fuel consumption is obtained with a lean mixture, as, for example a "lambda" value of about 1.15, but a lower power is obtained at this value. Such a lean mixture should be used in the cruising range when coasting or decelerating in order to obtain maximum economy and to prevent air contamination by unburnt fuel, etc.

An overall performance curve which indicates the best air fuel ratios under the various operating conditions is shown in FIG. 4. The value BMEP represents the brake mean effective pressure, which is the number of pounds per square inch if applied to the piston during its power stroke, would produce the same work as the combustion during that cycle.

From these considerations, the optimum actual operational points may be determined on each fish-hooked curve for each speed and throttle position. In FIG. 2 these points are marked by dots and connected by lines on each speed range represented by a single plane on the graph. As may be noted, points higher up on the fish-hooked curves indicating richer mixtures are chosen in the low speed range, the lowest points of maximum economy in the middle speed range and higher points indicating richer mixtures for the wider throttle positions are indicated in the higher speed range.

If in actual operation for every speed for every throttle position, fuel amounts corresponding to marked points on the fish-hook curves could be delivered to the cylinders, the engine would at all times be operated under ideal conditions.

The exact quantity of fuel to be injected per stroke as indicated by these points on the fish-hook curves may be very easily calculated, and these values may be plotted on the ordinate against the throttle or foot feed position on the abscissa of the curve for each speed range. Such a graph is shown in FIG. 5. As may be noted, the curve for each speed range is not exactly parallel to the other but closely proximates curves of the other speeds in general shape. The curve of FIG. 5 indicates the best fuel quantity to be injected in an injection system for any throttle or foot feed position at any speed. For any given speed the load varies with the function of the throttle position so that the diagram shown in FIG. 5 is a complete answer to the air fuel mixture problem and a fuel injection system which will inject the quantity indicated on the ordinate for every throttle or foot feed position on the abscissa on each speed curve will supply the ideal quantity of fuel to the engine under all operating conditions.

In accordance with the present invention, I provide a fuel injection system which in contrast to all prior known systems in its basic and most simple form, delivers a quantity of fuel for injection, dependent on the throttle position and engine speed as separate control influences, and independent of a sensing of the air flow to the cylinders.

In my novel fuel injection system, I use a system of rotating and fixed discs in order to distribute the fuel to the injection nozzles of the various cylinders of the engine and in order to correctly meter the fuel in accordance with FIG. 5. Depending on their characteristic, some engines can be operated with a so-called simple distributor system, i.e., one having only speed and load control. Other engines, however, have a characteristic which demands an additional combined speed and load correction. Referring now again to the drawings, and in particular to FIGS. 6 and 7, a simple system of such fixed and rotating discs is shown diagrammatically for a better understanding of the present invention. In the drawing, a pressure tight housing 1 is disclosed, which has an end cover 11. This end cover 11 has a plurality of orifices 12 (the term "orifice" being used herein synonymously with "hole" or "opening") defined therethrough, which corresponds to the number of cylinders of the internal combustion engine in connection with which the fuel injection system is used. Pressure fuel lines lead from the orifice 12 to injection nozzles positioned, for example, in the inlet manifold adjacent to the inlet valves of the cylinders (not shown). A fixed disc 8, is positioned in the housing in space relationship to the end cover 11. This fixed disc 8 has the orifices 12a extending therethrough which correspond to and are in axial alignment with the orifices 12 of the end cover 11. Positioned between the fixed disc 8 and the end cover 11 are a pair of rotating distributing discs 3 and 4. The discs 3 and 4 are connected for rotation with the shaft 13. Discs 3 and 4 have the coinciding slot openings 3a and 4a, respectively, which are positioned at the same radial distance from the axis of rotation of the discs as the orifices 12 and 12a, so that upon rotation with the shaft 13 of discs 3 and 4, the openings 3a and 4a will pass each of the orifices 12 and 12a in series establishing an interrupting path flow therethrough.

The distributing disc 3 is directly keyed to the shaft 13. The distributing disc 4 has a sleeve 14 through which the shaft 13 extends. This sleeve 14 has a hollow helix shaped slot 14a. The end of the shaft 13 is hollow and a control rod 5 is positioned in the hollow portion of the shaft 13 and can move axially therein. A pin 15 is connected to the control rod 5 and extends through the helix slot 14a so that axial movement of the control rod 5 will cause a limited turning of the sleeve 14 and, thus, of the disc 4 relative to the disc 3, allowing a controllable variation of the degree of coincidence between the slot openings 3a and 4a. In this manner, the effective opening through the distributing discs 3 and 4 can be controlled which in turn at any given speed of rotation will control the amount of fuel at a given pressure passing through the openings 12a and 12 as the slot openings 3a and 4a pass in coincidence therewith.

Referring now again to the drawings, and in particular to FIG. 7, a maximum opening is effected when the openings 3a and 4a exactly coincide and the effected length of this opening decreases as these two openings are brought out of coincidence. The rear end of the housing may be sealed by an end plate 6 and fuel under pressure may be fed into the housing behind the disc 8 by means of a pressure fuel pump 8'. The shaft 13 should be connected for proper rotational synchronization with the crankshaft of the internal combustion engine, as, for example, in the manner of the electrical distributor. In a 4-cycle engine the shaft 13 will rotate at half the engine speed, while in a 2-cycle engine it will rotate at the engine speed. As the distributing discs 3 and 4 rotate, the fuel is sequentially allowed to pass through orifices 12a and 12 to the various cylinders of the engine. The correct distribution is controlled by the distributing disc openings 3a and 4a in the same manner as the rotor of the ignition distributor distributes the current to the various spark plugs of the ignition type engine.

In order to obtain the correct fuel metering corresponding to FIG. 5, the amount of fuel pumped through each pair of orifices 12a and 12 on each stroke, i.e., each time the openings 3a and 4a pass in coincidence therewith, the quantity of fuel pumped must, on one hand, be varied, in accordance with the throttle or accelerator position. This may be done as, for example, by controlling the pressure of fuel pumped by the pump, in accordance with the throttle or accelerator position, or by some other means as will be explained in further detail hereinafter.

As the discs 3 and 4 rotate and the engine speed is increased, the speed of rotation of the discs 3, 4, will correspondingly increase so that the time of coincidence of an effective slot opening of a given size with each orifice 12a—12, will correspondingly decrease. As a result of this, fuel quantity would decrease with an increase in speed and of course satisfactory operation could not be achieved.

If, however, the effective slot opening is increased in proportion to the increase in speed, this may be compensated for. If the curve of FIG. 5 is converted into a curve plotting the quantity injected per stroke on the ordinate against the engine speed on the abscissa, with a separate curve for each throttle position, curves corresponding to FIG. 5a results.

With the distributor corresponding to the distributor of FIG. 6, at any given speed of rotation and throttle position at a constant fuel pressure, the quantity of fuel will solely depend on the angle of coincidence of the slot openings. On such a curve, therefore, the slot opening or angle of slot overlap may be calculated from the quantity of fuel injected per stroke at a given pressure and throttle position, and the quantity of fuel injected per stroke may be plotted as the ordinate in place of the angle of the fuel quantity. Such curve is shown in FIG. 8.

I have found that the response of a centrifugal governor actuated by flyweights which are forced outwardly upon rotation by means of centrifugal force, when plotted on a graph describes curves which in general, have the same curve direction as the curves showing the throttle position in FIG. 8. Therefore, if a flyweight type centrifugal governor is connected for rotation with the engine or with the shaft 13 and the actuation thereof is used to actuate control rod 5, so that with increasing speed the degree of coincidence of the slotted openings 3a and 4a may be increased, the normal decrease in fuel occurring with increasing speeds of revolution of the discs 3 and 4 may be compensated and the governor due to inherent characteristics may be designed to very closely approximate the curvature of at least one of the throttle position curves of FIG. 8 as shown in FIG. 8a.

As may be noted from FIG. 5a, the fuel quantity injected per injection at each throttle position increases from idle to a given speed point and then decreases. Various designs of the centrifugal governor and slotted distributing discs may be used to achieve this function. If the centrifugal governor is designed so that an additional spring comes into play against the outward movement of the flyweights at the speed where the decrease in the injected quantity of fuel occurs, the rate of increase of coincidence between the slots 3a and 4a will decrease with increasing speed past this speed range, so that the normal decrease in fuel quantity which occurs with increase, the speeds of revolution of the disc may be used to approximate the downwardly sloping of the curve. Alternately, depending upon the design of the discs and the slope of the curves, the slots may reach complete overlap at this speed point of maximum injected quantity per injection, so that upon a further increase in speed there is no further increase in the effective slot opening and the increase in speed of the revolution causes the natural decrease in the fuel quantity, matching the downwardly sloped curve. In this manner, the distributor and its governor may be designed to match the characteristics of the curves for a given engine. The initial positioning and degree of overlap between the slots will also have an effect in the characteristic curve. Thus, for example, if the slots have initial degree of coincidence at the starting revolutions, the quantity of fuel injected will decrease until the point is reached where the governor comes into play, and will then increase until the slots are in complete coincidence, or until the governor moves against an increasing force, such as an additional spring. Thus, it may be seen that various shaped curves may be approximated in accordance with the present invention. By approximating for example, a throttle position curve in the central position of the group of the throttle position curves by suitable governor design, which is possible due to the inherent governor characteristics, and by additionally varying the quantity of fuel passed through the distributor, as, for example, by means of varying the fuel pressure in accordance with the throttle position, the various throttle curves can be brought together and the ideal conditions of fuel injection shown in FIG. 3 may be achieved independent of a sensing of the air flow to the cylinders, and merely by varying the quantity of fuel injected, dependent upon the throttle position and engine speed.

A highly effective distributing and metering device for the injection system in accordance with the present invention in its simple form, therefore, merely comprises a centrifugal governor which actuates control rod 5 in FIG. 6, and means for further varying quantity of fuel passed through the distributor in accordance with the throttle position, as, for example, by varying the quantity of fuel delivered by the pump and passing through the distributor.

To be sure the various curves of the various throttle positions as shown in FIG. 5a are not exactly parallel to each other, so that with such a distributor an exact metering under all operating conditions is not achieved, but the accuracy in general is far in excess of that required in normal passenger automotive needs, and is far more accurate than conventional carburation systems or prior fuel injection system.

A very exact response, which exactly duplicates the ideal requirements may be obtained, if the governor response used additionally varies in accordance with the throttle position so that all curves are exactly duplicated, or by other means which will be described in detail hereinafter.

In the embodiment, as shown in FIGS. 9 and 10, the slotted distributing discs 3 and 4 corresponding to discs 3 and 4 of FIG. 6 are rotatably mounted in the housing 1, between the fixed disc 8 having the orifices 12a, and the portion of the housing wall defining the orifices 12 in the same manner described in connection with the embodiment of FIG. 6. The distributing disc 3 is rigidly connected for rotation with the shaft 13, while the distributing disc 4 may rotate relative to the shaft 13. A disc 34 is connected and rotates with the shaft 13. This disc 34 has the pins 36 connected thereto, while the distributing disc 4 has the pins 37 connected thereto. The pins 36 are connected to the pins 37 by means of springs 38 which carry the flyweights 35, as may best be seen from FIG. 10. As the disc 34 is rotated with the shaft 13, the distributing disc 4 is caused to rotate therewith by the action of the springs 38. As the rotational speed increases, the weights 35 are thrown outwardly by means of the centrifugal force, thereby shortening the distance between the pins 37 and 36, and causing a limited rotational motion between the distributing disc 4 and the discs 34 and 3. The change in the relative rotational position between the distributing discs 4 and 3 varies the degree of coincidence between their slotted openings 4a and 3a. The discs are so positioned that as the weights 35 are thrown outwardly by centrifugal force and the distance between the pins 36 and 37 are shortened, the degree of coincidence between the slotted openings 3a and 4a increases, thus compensating for the natural decrease in the fuel which occurs with increasing rotational speed and providing a variation in the amount of fuel metered therethrough, in accordance with the rotational speed of the engine in the same manner as if a centrifugal governor were used to actuate the control rod 5a in FIG. 6. Fuel from a fuel pump is pumped into the space in front of the disc 8 and flows through the orifices 12a, 3a, 4a, 12 through the fuel line 17, and injection nozzle 18 into the inlet manifold 19 of the cylinder 20 of an internal combustion engine of the ignition type to which the distributor is connected. Alternately the injection nozzle 18 may lead directly into the cylinder as shown in dotted lines. Assuming the engine to be a 4-cycle engine, the shaft 13 is rotated at half the speed of the engine in the same manner as the distributor for the ignition system. The shaft 13 is so timed with the engine and the slots 3a and 4a are positioned on distributing discs 3 and 4, that the same pass into coincidence with the orifices 12 and 12a, as shown on the drawing on the intake stroke of the cylinder 20, shown when the intake valve is open so that the fuel injected by the nozzle 18 will be drawn into the cylinder. Similar orifices 12 and 12a, fuel lines 17 and injection lines 18 are provided for the other cylinders of the engine and timing is so effected that the slotted openings 3a and 4a pass in coincidence with the opening 12, connected to a particular cylinder on the intake stroke of that cylinder.

In connection with a 2-cycle engine, the shaft 13 would rotate at the engine speed and the injection nozzle 18 would preferably lead directly into the cylinder with the injection being effected at the end of the intake stroke or during the compression stroke to avoid loss of fuel during scavenging. The discs as shown are so constructed that they only come in contact at an annular surface portion near their outer edge. With flat discs which slide upon one another over their entire surface width, greater wear occurs near the outer edges which, in time, will cause leakage. In the embodiment shown this wear is automatically compensated for and the discs do not have to be extremely wear resistant and may, for example, be made of softer metals, rubber or plastic so that the same are self lapping and sealing. The discs 3, 4, and 8 have a limited axial play so that the spring pressure caused by the spring 10 and the fuel pressure behind these elements will continuously compensate for the wear and maintain the parts in exact sealing contact. In addition, at higher fuel pressures, when the tendency towards leakage is the greatest, the sealing pressure correspondingly increases.

A portion of the fuel pumped by the pump may flow from in front of the disc 8 past the valve 21 into the housing 22, and out of the line 23, recirculated back to the pump. The amount of fuel which is thus recirculated is dependent upon the degree of closure of the valve 21 which in turn is determined by the pressure of the spring 24. The pressure of the spring 24 is controlled by means of a cam 25a controlled by the rod 25 which is connected to the accelerator pedal 26 of the engine and the throttle valve 27 of the engine. As the throttle is opened, the pressure on the spring 24 is correspondingly increased so that the pressure in the injection system increases, a corresponding increased amount of fuel is forced through the orifice and slotted openings to the cylinder of the engine and there is a corresponding decrease in the amount of fuel recycled. The position of the foot pedal 26 and thus the throttle 27, therefore, in part determines the pressure of the fuel and the amount of fuel metered to the cylinders of the engine. The fuel metering is, therefore, controlled as a function of the engine speed and throttle position, and the ideal condtions of injection as shown in FIGS. 5, 5a and 8 may be achieved. Here, again, the exact metering conditions which would be obtained by following each individual curve for each throttle position as shown in FIG. 5a is not achieved but a throttle position curve, for example, approximating the throttle position curve in the central position of the group (FIG. 8a) may be fairly exactly approximated and a metering accuracy is obtained which is far greater than that which was previously possible in carburetion and prior fuel injection systems.

The embodiment shown in FIGS. 11 and 12 corresponds exactly to that shown in FIG. 9, except that the variation in fuel in dependence upon the throttle position is not made by a by-pass control valve 21 in a housing 22, but the fixed disc 8 is replaced by the turntable discs 16, having the orifices 12a extending therethrough. This turnable disc 16 is connected to the shaft 29, which in turn is connected by the linkage 28 to the throttle control so that the shaft 29 and disc 16 is turned a limited amount as the throttle is opened and closed. A turning of the shaft 29 and disc 16 with the throttle, therefore, varies the alignment between the orifices 12a and orifices 12 as may best be seen in FIG. 11. When the orifices 12 and 12a are in exact axial alignment a maximum quantity of fuel will flow at a given fuel pressure and effective slot 3a, 4a opening and a given rotational speed for the discs 3 and 4. As the orifices 12 and 12a are moved out of alignment by rotation of the shaft 29, the quantity of fuel correspondingly decreases. If the orifices 12 and 12a are brought out of alignment for an angular distance greater than the effective length of the slots 3a and 4a, no fuel will be delivered so that under operating conditions this adjustment must always be effected within the limits of this effective slot length between the slots 3a and 4a. The connection between the linkage 28 and the throttle is such that as the accelerator is depressed and the throttle is opened wider, the shaft 29 and disc 16 is rotated in a direction to bring the orifices 12 and 12a in more exact alignment and as the accelerator is released and the throttle valve is moved toward its closed position, disc 16 is rotated, bringing the orifices 12 and 12a further out of alignment. The governor control which effects the relative rotational positions of the distributing discs 3 and 4 and thus effective slot opening 3a and 4a, is identical to that described in connection with FIG. 9. The fuel metering here again is controlled as a function of the engine speed and the throttle position.

The embodiment shown in FIG. 13 corresponds to that shown in FIG. 6, except that the disc 16 with the orifices 12a is a turnable disc, constructed in the identical manner with the disc 16 shown in FIG. 12, mounted on the shaft 29, and provided with the linkage 28 connected to the throttle. Additionally, the member 11 which defines the orifices 12 is in the form of a turntable disc, the relative rotational position of which may be controlled by means of the rack and gear 30. The position of the control rod 5 is determined by the rotational speed of the engine and is, for example, actuated by a centrifugal governor in the same manner as the embodiment of FIG. 6. The disc 16 is controlled by the throttle positon through the linkage 28 and shaft 29, so that the amount of fuel metered is controlled as a function of the engine speed and throttle position. The relative turning of the turnable disc 11 to the rack and gear arrangement 30 allows the introduction of an independent fuel metering control factor which may, for example, be controlled by the atmospheric pressure, temperature in the inlet manifold or in order to enrich the fuel mixture at full load throttle or the like.

Referring to FIG. 13a it may be seen how fuel passes from the orifice 12a through the slotted openings 3a and 4a, through the orifice 12 so long as the orifice 12 and the orifice 12a are lined up with the slotted openings 3a and 4a. The radial distance between the orifices 12 and 12a is indicated by the angle alpha ($\alpha$) and will determine the fuel metering and timing for any given rotational speed and effective slot opening. If the angle alpha exceeds the angle between the edges of the slot 3a—4a, of course, no fuel will pass through the distributor. The smaller the angle of alpha becomes, i.e., the closer 12 and 12a become aligned, the greater the amount of fuel will pass through the device at a given rotational speed. From this may be seen how the amount of fuel metered may be varied by varying the rotational position of the disc 16 in accordance with the throttle position, and how the angle alpha is additionally determined by the position of the disc 11, allowing a further independent control factor.

In the embodiment as shown in FIG. 14, a further embodiment of an internal centrifugal governor is provided for automatically adjusting the relative position of the distributing discs 3 and 4, and the degree of coincidence between their slots 3a and 4a to automatically compensate for a decrease in the amount of fuel injected with increasing engine speed and to provide fuel metering as a function of the engine speed.

The distributing discs 3 and 4 are positioned in the housing 1, in the same manner as described in connection with the previous embodiment. The distributing disc 4 is mounted on and rotates with the sleeve 31 of the governor housing 32. The governor housing 32 is rotatably mounted within an extension of the distributor housing 1 on the ball bearings 33 and 39, respectively. The governor itself consists of the flyweight 40, the crank arms 41, the links 42, the slotted links 43, the spring 44 and pin end 45. The flyweight 40 and their rigidly connected crank arms 41 are pivotably connected to a helix threaded spindle 46, which can move axially at least a limited amount with respect to the governor housing 32. The distributing disc 3 is mounted on an extension 47 of the helix threaded sleeve 48, which is threaded in engagement with the helix spindle 46. Axial movement of the spindle 46 within the sleeve 48, will cause a limited rotation of the sleeve 48 with the governor housing 32, and thus cause a limited rotation of the distributing disc 3 with respect to the distributing disc 4, varying the coincidence between their corresponding slots 3a and 4a. A control rod 49 extends axially through the device and is rigidly connected to the pin end 45, so that axial movement of the control rod 49 will cause corresponding axial movement of the pin end 45, which in turn will cause pivoting of the links 42, 43, axial movement of spindle 46 and a corresponding rotational motion of the helix threaded sleeve 48 and its connected disc 3. The control rod 49 may be connected for actuation by the engine throttle.

In operation, the distributing discs 3 and 4 and the governor are rotated by means of the shaft-like extension of the governor housing 32 in synchronization with the internal combustion engine in the identical manner described in connection with the previous embodiment. Fuel is pumped under pressure from the pump to behind the member 8 which is in the form of an annular disc. Fuel pressure, in addition to the spring pressure, effects a sealing between the parts. As the distributing discs 3 and 4 rotate, the fuel passes through their slotted openings 3a and 4a, through the orifice 12 of the member 11 and through the fuel pressure lines to the injection nozzles of the internal combustion engine in connection with which the fuel distributor is used. The control rod 49 is connected to the throttle controls which vary the opening of the throttle or butterfly valve in the air intake manifold of the engine. Axial movement of this control rod varies the degree of coincidence between the slotted openings 3a and 4a, thus varying the amount of fuel needed in accordance with the throttle position of the engine.

As the engine speed increases the flyweights 40 are moved by centrifugal force further and further away from the axis of rotation against the force of the retaining spring 44. The outward movement of the flyweights 40 causes a corresponding inward movement of the crank arms 41 in the slots of the slotted connecting links 43, which are pivotably connected to the wall of the governor housing 32. This inward movement along the slotted openings of the connecting links 43 causes an axial movement of the helix spindle 22 to which the pivot of the flyweights 40 and crank arms 41 is attached. The end of the control rod 49 is connected to the pin 45 and the slotted links 43 are connected to the pin 45 by means of a linkage 42. The pin 45 effects an axial sliding movement with the helix spindle 46 and as the helix spindle 46 moves by the outward centrifugal motion of the flyweights 40 in accordance with the speed, the distributing disc 3 is rotated relative to the distributing disc 4 which rotates with the governor housing 32 to bring the slotted openings 3a in greater coincidence with the slotted opening 4a thus compensating for the normal decrease in fuel metering due to the increase in rotational speed and providing a fuel metering control in dependence on the engine speed. The fuel metering is thus controlled as a function of the engine speed and throttle position meeting the requirements of FIGS. 5a and 8.

In certain cases it is desirable to over-rich the fuel mixture at idling and/or full speed conditions to prevent any tendency towards stalling at idle and/or to provide the maximum power at full speed. This may be effected, for example, by the embodiment as shown in FIG. 14, by providing additional springs which to operate against the springs 44 in the idle and/or high speed range or by suitably dimensioning the governor, as, for example, by suitably dimensioning the shape of the slotted links 43.

In the embodiment as shown in FIG. 15, a spring 50 connects the two crank arms 41. The take-up of the spring 50 is so dimensioned that the spring 50 will not tend to pull the crank arms 41 together and thus work against spring 44 until the crank arms have moved the distance apart which they normally assume when the engine is slowed down to the idle speed range.

In the embodiment as shown in FIG. 16, the slotted links 43 are so dimensioned that the rate of curvature of the slot changes at the portions contacted by the crank arm 41 when the engine speed is in the high speed range thus increasing fuel richness in the high speed range. This construction of the governor, in addition to being used for increasing the fuel richness at idle and/or high speed may also be used so that the governor response will more approximate the individual curves for the governor response for each throttle position shown in FIG. 8.

The embodiment shown in FIGS. 17, 18 and 19 is identical to that shown in FIG. 14 except that the helix arrangement for effecting relative turning of one distributing disc with respect to the other is replaced by a hydraulically operated servo motor. The helix spindle 46 of FIG. 14 is replaced by the piston 52 and the helix threaded sleeve 48 is replaced by the corresponding hydraulically actuated member 48a. The flyweights 40 of the governor are connected by means of a linkage 53 to the control piston 52, so that when centrifugal force throws the flyweights 40 outwardly, the piston 52 is moved axially in a direction toward the pivot point of the flyweights. A coil spring 54 urges the piston 52 axially in the opposite direction. The control rod 49 slidably extends through the piston 52 and is connected to the end pin 45 to which the flyweights 40 of the governor are pivotally connected. Axial movement of the control rod 49 will, therefore, cause axial movement of the piston 52 while the governor arrangement exerts an indepedent control with respect to the axial movement of the piston 52 which is dependent upon the engine speed. Control rod 49 is connected to the throttle control of the engine in the manner of the previously described embodiment. The piston 52 has three grooves 55, the center grooves being under oil pressure while the other two grooves are pressure relieved. This may be effected, for example, by having oil from any oil pump lead to the center groove while the other two grooves have free oil lead offs which, for example, may return to the oil pump. The oil pump may be the conventional oil pump used for pressure lubricating the engine. The sleeve 48a, as may best be seen from FIG. 18, is cylindrical in shape and has a vertical upright rib 48b. A cylindrical sleeve 57 surrounds the sleeve 48a and has a longitudinal notch into which the rib 48b extends. Two axially spaced apart bores 56 extend through the member 48a, one of the bores terminating on one side of the rib 48b and the other on the other side of the rib. The two bores 56 are so axially spaced apart that when the system is in equilibrium they will be covered by the lands between the grooves 55. When, however, the piston 52 is moved axially one of the two holes will be connected with a pressure relief groove 55, while the other is connected with a pressurized groove 55. Thus, referring to FIG. 18, either the space to the left of the rib 48b will be pressure relieved and the space to the right pressurized, or vice versa. In this manner, depending upon the axial position of the piston 52, the rib 48b and thus the member 48a, will be rotated within the limits defined by the groove within which the rib 48b moves and thus the distributing disc 3 will be rotated relative to the distributing disc 4 varying the degree of coincidence between the slots 3a and 4a. The throttle control is effected by axial movement of the control rod 49, whereas the governor automatically adjusts the degree of coincidence between the slots to compensate for the speed in the manner described and to provide control metering in accordance with the engine speed to meet the conditions of FIGS. 5a and 8.

The grooves 55 may be somewhat inclined to the axis of the piston 52 and by a suitable selection of this angle of inclination any desired ratio of axial movement to rotation may be achieved so that a very accurate governor response meeting the conditions of FIGS. 5a and 8 may be obtained. If the angle of the grooves is made variable, the governor characteristics will correspondingly change so that the same may be constructed to exactly follow the response curves in question and a very accurate fuel metering may be obtained.

Except for the fact that the relative rotational position of the disc 3 is varied with respect to the disc 4, by means of having the sleeve 48a and its connected portion 41 actuated hydraulically as determined by the axial position of the piston 52, the operation is in all other respects identical to that described in connection with FIG. 14.

While in all of the above described embodiments, two rotating distributing discs are used which may have their relative rotational positions adjusted to vary the degree of coincidence between their openings for effecting the fuel metering in accordance with the engine speed, it is also possible to utilize but a single rotating distributing disc and to effect the control of the fuel metering by effecting a relative turning between the two end members 8 and 11 to vary the alignment of their orifices 12a and 12. As can readily be seen, if the rotating distributing disc has a slotted opening, and if the radial alignment of the orifices 12 and 12a is varied over a distance equal to the length of this slot, the fuel passed through the device at any rotational speed will increase as the orifices are brought more and more in alignment. The metering control of the fuel in accordance with the throttle position, may be effected by varying the rotational position of one of these members and the fuel metering in dependence on the engine speed and to compensate for the normally decreasing amount of fuel metered with increasing speed may be effected by turning the other of the members in accordance with the engine speed as, for example, by means of a centrifugal governor.

In the embodiment shown in FIG. 20, the turnable disc 16 is attached to the shaft 29 and may be turned by means of the linkage 28 which is connected to the accelerator and throttle control of the engine to vary the alignment between the orifices 12a and 12. The member 11 is also in the form of a turnable disc and has an extended sleeve portion 61, which is threaded over the externally threaded helix spindle 60, so that axial movement of the spindle 60 will effect the turning of the sleeve 61 and disc 11. The distributing disc 3, provided with the slotted opening 3a, is connected for rotation with the shaft 13, and is synchronized with the engine in the manner described above. Flyweights 40 are connected by means of the linkage 58 to a slideable collar 59, which engages the spindle 60 in such a manner that the collar may rotate around the spindle but may not move axially with respect to the spindle. As the shaft 13 rotates, the flyweights are moved outwardly by centrifugal force against the action of the spring 62. The movement of the flyweights is transmitted through the linkage 58, collar 59 to the spindle 60, which, in turn, causes a limited rotation of the disc 11 and orifice 12, by transmitting its axial movement to rotational movement, due to the threaded helix connection with the sleeve 61. This varies the alignment of the orifice 12 with the orifice 12a, in accordance with the engine speed, the orifices being brought in closer alignment as the speed increases to compensate in the natural decrease of the fuel metered and to provide a metering controlled by the engine speed. The fuel metering control is also controlled by movement of the disc 16, which is connected to the throttle by means of the shaft 29, and linkage 28, so that the amount of fuel metered is controlled in accordance with the engine speed and throttle position meeting the conditions of FIG. 5a.

In the embodiment as shown in FIG. 21, the disc 16 has an extended sleeve portion, 8a, with an externally threaded helix. An axially movable sleeve 63, with an internally threaded helix is threaded over the externally threaded helix portion 8a. Axial movement of the sleeve 63 will effect a turning motion of the sleeve 8a, and thus the disc 16, due to the threaded helixes. An end slotted rod 64, is centrally pivotably connected to the sleeve 63. A pin 65 is connected to the end of the bell crank lever 66—67 engaged in a slot at one end of the slotted rod 64. The other end, 67, of the bell crank lever is connected to an axially slideable sleeve 68, of a centrifugal governor. The governor has a sleeve 71, rigidly connected for rotation with the shaft 13, by means of a key. The fixed sleeve 71, and the sleeve 68, which is axially slideable on the shaft 13 are connected by means of the spring 72. Flyweights 69, are pivotably connected to the sleeve 71, and are connected to the sleeve 68 by intermediate links 73, so that upon pivoting of the flyweight outwardly, the sleeve 68 is pulled toward the sleeve 71, compressing the spring 72. The other end of the slotted rod 64 is connected to a control rod 70, by means of a pin fixed to the end of the control rod 70, which extends in the slot on the end of the end slotted rod 64. The shaft 13 rotates in synchonization with the engine in the previously described manner, and the control rod 70 is connected to the throttle linkage of the engine.

In operation, as the shaft 13 rotates, centrifugal force causes the flyweights 69 to pivot outwardly, forcing sleeve 68 to slide along the shaft 13 toward the sleeve 71 compressing the spring 72. Movement of the sleeve 68 causes pivoting of the bell crank lever 66—67, moving the pin 65 upward in the slot of the lever 64, and thus varying the pivot point of this lever. Movement of the control rod 70 causes axial movement of the sleeve 63, by pivoting the lever 64 around the pin 65, and causes a limited rotation of the disc 8 with respect to the member 11. With the control rod 70 maintained in a fixed position, the variation in the speed of the shaft 13 will cause movement of flyweights 69 and thus move the pin 65 in the slot of the lever 64, causing pivoting of the lever 64 about the pin connected to the control rod 70, thus moving the sleeve 63, and rotating the disc 16 with respect to the member 11, varying the degree of alignment between the orifices 12, 12a, as shown in FIG. 13a, and thus varying the quantity of fuel metered. The amount of fuel metered is thus varied in dependence on the throttle position and the engine speed, meeting the control requirements, in accordance with the present invention. Since the pin 65 moves in the slot of the slotted lever 64 in dependence upon the speed of rotation of the shaft 13, and since the pin 65 constitutes the pivot point to the lever 64 upon movement of the control rod 70, the effect of the response of the governor on the disc 16 is varied dependent upon the throttle position, so that a very accurate degree of control may be obtained which may closely approximate each speed curve for each throttle position as is shown in FIG. 5a.

Referring to the embodiment shown in FIG. 22, the same substantially corresponds in structure and operation to that shown in FIG. 9, except for a slightly different arrangement for varying the fuel pressure in order to meter the quantity of fuel in dependence upon the throttle position. In this embodiment, the by-pass consists of a by-pass passage 74, leading from the space in front of the disc 8 into which the fuel is initially pumped from the pump, through an adjustable needle valve 75 controlled by the control rod 25 past the spring controlled excess pressure valve 76 through the return line 23 back to the pump. The spring loaded excess valve 76 is adjusted to open at a pressure slightly above the pressure necessary to pass the fuel through the injection nozzles of the internal combustion engine. The control rod 25 is connected to the linkage of the throttle valve and the accelerator in the identical manner as described in connection with FIG. 9.

Assuming the pump to be a constant delivery pump, the device works in the identical manner as described in connection with the embodiment of FIG. 9. As the engine rotates, the slots 4a and 3a are brought in closer coincidence at increasing engine speeds in order to provide a compensation for the increasing velocity of the discs 3 and 4, and to provide a fuel metering in dependence on the engine speed. As the accelerator is pressed and the throttle valve is opened, the control rod 25 is moved to the left, thus closing the needle valve 75 to a greater extent and cutting back the amount of fuel which is by-passed through the line 23 back to the pump. This causes an increase in the fuel pressure in front of the disc 8 and thus a metering of the fuel quantity is in dependence on the throttle position. As the accelerator is released and the throttle valve is closed to a greater extent, the rod 25 is pulled out, opening the needle valve 75 to a greater extent, and allowing a greater quantity of fuel to recycle through the line 23, thus cutting down the effective fuel pressure in the space in front of the disc 8 and reducing the amount of fuel passed to the cylinders at a given speed of rotation of the discs 3 and 4. The excess pressure valve 76 assures that there will always be sufficient pressure to allow the fuel to be passed through the injection nozzles and the same will not open to allow by-pass through the line 23, until this pressure is exceeded.

If, however, the fuel pump is a variable delivery pump, delivering a quantity of fuel dependent upon the engine speed, as, for example, a pump driven by the engine, the speed influences at a constant throttle setting will effect a change in the fuel pressure in an equalizing space in front of the disc 8. Thus, as the engine speed increases, the fuel pressure in this space will correspondingly increase. In order to allow the throttle position to effect the desired control influence as is set forth above, the centrifugal governor may be designed so as to compensate for the variations in the fuel pressure caused solely by the increase in speed by a suitable design of the flyweights and springs of the governor. Thus, the governor may be designed so that the increase in the degree of coincidence between the slots 3a and 4a increases at a decreasing rate, with increasing engine speed to compensate for this increase in fuel pressure. Additionally, the pressure in the equalizing space may be controlled by an adjustment of the relief valve 76, which allows an additional control factor. By increasing the force required to open the relief valve 76, as, for example, by increasing the spring tension, the pressure in the equalizing space in front of the disk 8 may be increased.

In the operation of this embodiment of the present invention in which the position of the throttle valve determines the rotational position of the turnable disc, as, for example as shown in FIG. 12, the degree at which the turnable disc 16 may be turned in relation to the member 11, is determined by the minimum effective slot opening between the slots 3a and 4a at the lowest engine speed. If, the turnable disk 16 was turned with respect to the member 11, a greater angle than the angle of this minimum effective slot width, when the engine was at low speed no fuel would flow and the engine would stall. In practical operation, the minimum effective size of the slot opening between the slots 3a and 4a, is often too small to allow adequate control by turning the disc 16 within these relatively narrow limits. In order to compensate for this, and allow an adequate adjustment of the disc 16, and satisfactory operation at low speeds and at relatively closed throttle positions, additional holes may be provided through the rotating disc 4 adjacent to the slot 4a on the same radius from the axis of rotation as the slot 4a. Embodiment of such discs are shown in FIGS. 23, 24, 25, 25a, 26 and 26a. As shown, the rotating distributing disc 4 has the additional holes 77, which have a well defined geometrical relationship with respect to the effect of the centrifugal governor on the relative adjustment of the rotating distributing discs 3 and 4, in order to control the injective fuel quantity in a definite manner and prevent a complete cutoff of the fuel supply, while at the same time allowing an adequate adjustment of the disc 16. In this embodiment, at a relative turning of the disc 16, with respect to the member 11, which represents a relatively closed throttle position, and with a relatively small effective slot length between the slots 3a and 4a, at low engine speeds, the effective slot opening between the slots 3a and 4a would never pass in simultaneous coincidence between the orifices 12a and 12, as shown in FIG. 24. With the additional holes 77, however, communication is established through the orifice 12a, the slot 3a, and the holes 77 to the orifice 12, allowing the flow of fuel. The auxiliary holes 77 must be specifically designed to meet the respective speed and load, i.e., throttle position conditions. With increasing speed, the effective overlapping of the slots 3a and 4a increases more and more, while the effective number of supplementary holds 77, which comes in registry with the slot 3a decreases, until at the full speed position as shown in FIG. 23, the auxiliary holes 77 are no longer effective. The effect of a single additional hole is shown in the graph of FIG. 27. The lands between the auxiliary holes 77 and the slot 4a should be designed in such a way that each hole can come into action individually when required. Thus, this combination of control slots and the supplementary holes will effect the fuel thru-put over the operational speed range of the engine and may be so adjusted that the requirements as shown in FIG. 5a and 8 are met. In order to more accurately meet these requirements, the diameters of the auxiliary holes 77 may be decreased in the direction away from the adjacent control slot 4a as shown in the drawing. The effect of the auxiliary holes 77, in combination with the slot 3a may be correlated to an effective slot opening in degrees in a simple manner, in order to obtain the conditions of FIG. 8.

In accordance with a further embodiment of the invention, provision may be provided for delivering a quantity of fuel to the orifice 12, irrespective of the load conditions or the degree of registry of the control slots 3a and 4a, and the distributing discs 3 and 4. This may be effected by providing an additional flow passage through the distributing disc 4, which is positioned for mating with each orifice 12, upon rotation of the disc 4, and by providing a constant flow communication between this additional flow passage and the space behind the disc 16. As shown in FIGS. 23 through 25, a slow passage 78, is provided for this purpose. This passage 78 extends into the disc 4 at the same radius as the slot 4a from the side of the disc adjacent the member 11, and extends at right angles through the periphery of the disc. In place of the passage 78, a simple groove may be provided as shown in FIGS. 26 and 26a.

As the discs are not sealed with the housing 1 at their edges, fuel flows from behind the disc 16, along the peripheral edges of the discs 16, 3 and 4, and through the flow passage 78, into the orifice 12a, when the orifice 12a registers with the flow passage 78, upon rotation of the disc, irrespective of the relative position of the turnable disc 16 or distributing discs 3 and 4. This will insure that a constant minimum quantity of fuel will flow at all times and prevent engine stalling, particularly during idling. The orifice 78 may, therefore, be considered an idling orifice, having a purpose analagous to the idle jet on a carburetor. This idling orifice 78 may be used in conjunction with the auxiliary holes 77, or be provided independent thereof, in accordance with any of the embodiments of the present invention.

In the previous embodiment as shown in FIGS. 12, 13, 20 and 21, for example, a control influence is exerted by causing a limited relative rotation of the disc 16, thus causing the orifice 12a to move along a circular path varying the degree of alignment between it and the orifice 12. It is, however, also possible to construct the device so that the orifice 12a is movable in a different manner, as, for example, along a radial line from the axis of rotation of the device. Such an embodiment is shown in FIGS. 28 and 29. This embodiment is identical in function and operation to the embodiment shown in FIG. 12, except that the disc 16 of FIG. 12 is replaced by an eccentrically movable disc 79 and the slot 3a through the rotating disc 3 is replaced by a triangularly shaped slot 3b.

The disc 79 is mounted on the eccentric cam 80 which may be rotated by means of the lever 28 and shaft 29, the lever 28 being connected to the engine throttle linkage. The disc 79 has a radial slot or keyway 71 in its top into which the key 82, firmly connected to the housing 1, extends. The extension of the key 82 in the slot 81 will prevent rotation of the disc 79, but will allow the disc to move vertically so that key 82 will extend a greater or lesser depth into the slot 81.

The orifice 12 and slot 4a are aligned with the base portion of the triangular opening 3b. When the eccentric 80 is adjusted so that the disc 79 is moved vertically to align the orifice 12a with the orifice 12, a maximum amount of fuel will pass through the orifices at any given rotational speed and fixed relationship between the slot 4a and opening 3b. As the disc 79 is moved vertically upward by means of the eccentric 80, so that the orifice 12a is brought more and more vertically out of alignment above the orifice 12, the amount of fuel metered correspondingly decreases with the other conditions remaining fixed, since the upper sloped surface of the triangular opening 3b will cut off the communication between the orifices 12 and 12a at an earlier point. The relationship between the part 4a and opening 3b is exactly the same as the relationship between the slots 3a and 4a of the previous embodiments with the degree of coincidence between these openings being the factor determining the amount of fuel metered at any given rotational speed. As the slot 4a and openings 3b are brought more and more out of coincidence, the effective slot length correspondingly decreases. In this connection, the effective slot length may be considered the effective slot length of the slot 4a in registry with the opening 3b.

The degree of coincidence between slot 4a and opening 3b is determined by the centrifugal governor as a function of speed in the identical manner as shown in connection with FIG. 12 and the vertical positioning of the slot 12a determined by the lever 28, which is connected to the throttle so that the conditions as shown in FIG. 5a are achieved.

Since the curves of the various throttle positions as shown in FIG. 5a are not exactly parallel to each other, the previously described embodiments will not produce the exact ideal metering requirements over the entire speed and load range, though generally the accuracy is sufficient for most purposes. In order to produce the exact ideal fuel metering requirement over the entire speed and load range, the control system does not only require a separate introduction of the individual control factor based on load and speed, but also requires a two dimensional combination of these control influences, so that the fuel control in dependence on the load, may be varied at various engine speeds. Thus, in addition to the separate introduction of the speed and load factors, the two must be combined to further influence the metering. This combination is not an additional or proportional combination, but it must be adapted to the individual engine in question.

An embodiment capable of performing this function and providing the exact ideal fuel metering requirements for the entire speed and load range is shown in FIG. 30. In addition, the embodiment is provided with the device for automatically compensating for variations in the ambient temperature and pressure which, of course, exert an influence on the fuel requirements of the engine.

In the housing 1, a rotating centrifugal governor housing 83 is connected for rotation with the shaft 13, which operates at half-engine speed for a four cycle engine and full engine speed for a two cycle engine, as previously described. The inside of the centrifugal governor housing 83, has two opposed eye brackets 84, in which two opposed centrifugal flyweights 86, are pivotably mounted by means of the pins 85. Only one of the flyweights 86, and one of the brackets 84 may be seen in the drawing due to the sectioning, but the other flyweight is identical in construction. The flyweight as shown in the drawing is pivotably mounted at its lower end in the positions shown, and the other flyweight is pivotably mounted at its upper end to the bracket 84 which is shown. The two flyweights are resiliently forced together by the springs 87 shown in FIG. 31. Upon rotation of the shaft 13 and the governor housing 83, the centrifugal force tends to pivot the weights 86 apart about their respective pivot points 85 against the spring force, the degree of pivoting apart being dependent upon the speed of rotation. The flyweights 86 have the pins 88 connected thereto. These pins engage in the slots 89 of the flange 90 of a sleeve member 91, so that as the flyweights 86 pivot outwardly about their points of pivot away from each other against the force of the springs 87, the pins 88 ride in the slots 89, causing a limited rotational movement of the flange 90 and sleeve 91, with respect to the governor housing 83. The sleeve 91 is connected to the sleeve 92, by corresponding mating axially extending lands and grooves which prevent rotation of the sleeve 92 with respect to the sleeve 91, but which allows the sleeve 92 to effect an axial sliding with respect to the sleeve 91. The sleeve 92 has an integral flange connected thereto on which there is mounted a three dimensional cam or control mound 93. The three dimensional cam 93 is dynamically balanced by means of the counter-weight 94, also connected to the flange of the sleeve 92.

A cam follower, 95, extends through the shaft 13 at right angles thereto and is movable in its own axial direction at right angles to the axis of the shaft 13. The cam follower 95 has a follower wheel 96 at one end in engagement with the three dimensional cam 93. The opposite end of the cam follower 95 has a spring 97, which tends to pull the end with the follower wheel 96 toward the shaft 13, thus serving to balance the centrifugal force of the heavier end with the follower 96, during rotation. The three dimensional cam 93 is pressed in firm contact with the follower wheel 96, by the action of the spring 98, which presses axially on the sleeve 92.

At the end of the housing 1 is a plate 99 through which the shaft 13 rotatably extends. The disc 99 has pins 100 connecting thereto, which axially slide through the housing wall, and carry at their end the taper roller bearing 101. The inner-race 102 of the taper roller bearing has an inner inclined surface which is engaged by the roller 104 connected to the cam follower 95. The inner-race 102 rotates with the cam follower and the shaft 13 but the roller 104 may roll radially with respect to the race 102. As the disc 99 is forced inwardly toward the housing, the bearing 101 and race 102 are correspondingly forced inwardly. The inward motion of the race 102 forces the roller 104 to roll radially inwardly, forcing the end of the cam follower with the wheel 96 toward the shaft 13, varying the position of the wheel 96 on the three dimensional cam 93, forcing the cam sleeve 92 inwardly against the pressure of the spring 98. Conversely, as the disc 99 is moved outwardly away from the housing 1, the roller 104 rolls radially outwardly away from the shaft 13 with the roller 96 moving radially outwardly along the three dimensional cam 93, as the spring 98 forces the cam in axial direction toward the disc 99. The disc 99 is connected to the throttle of the engine by a suitable linkage.

The distributing disc 4 is mounted on an extension sleeve 105 of the governor housing 83 and rotates therewith. The distributing disc 3 is mounted on the end of shaft 106. The shaft 106 has a helical thread at its opposite end which mates with a corresponding helical thread on the internal surface of the sleeve 92. Axial movement with the sleeve 92 with respect to the shaft 106, will, therefore, cause a rotary motion of the shaft 106 and a limited rotation of the distributing disc 3 with respect to distributing disc 4.

In operation, fuel is delivered to the inlet 107 by a conventional constant delivery, constant pressure fuel pump. The fuel passes through the orifices 12a, the slots 3a and 4a, and the orifice 12, passing from each orifice 12 to fuel line leading to an injection nozzle of the engine in the identical manner as described in connection with the embodiment of FIG. 9. In the same manner as FIG. 9, a fuel by-pass is provided for controlling the fuel pressure in dependence on the throttle position. This fuel by-pass has the valve 21, which releases fuel through the by-pass line 23, leading back to the pump. The valve 21 is controlled by the pressure of a spring 24, positioned in the housing 22 in the same manner as the embodiment of FIG. 9. The pressure of the spring 24 is controlled in dependence upon throttle position by means of the plunger 25 which is actuated by the cam 107a, which in turn is rotated by the rod 108 connected to the throttle by a suitable linkage. As the rod 108 is moved axially by actuation of the throttle, the same causes a pivoting of the cam 107, which in turn through the member 25 cause a greater or lesser force to be exerted on the spring 24, with the force increasing as the throttle is opened.

As the engine speed increases, the flyweights 86 pivot outwardly, due to centrifugal force, about their pivot points and against the resilient force of the spring 87. Outward pivoting causes pins 88 to ride in the slots 89, thus causing a relative turning of the flange 90 and sleeve 91, with respect to the governor housing 83. As the sleeve 91 is rotated it also causes the sleeve 92 to rotate therewith causing rotation of the shaft 106 and turning of the disc 3 in relation to the disc 4. Rotation of the sleeve 92 also causes a rotation of the three dimensional cam 93 which varies the rotational position of contact of the wheel 96 with the three dimensional cam 93. If the thickness of the cam at its point of contact with the wheel 96 changes as the rotational position is varied, and the cam, the flange and the sleeve 92 will be forced to move axially. This axial movement through the helical thread will cause a further limited rotation of shaft 106, and thus cause the disc 3 to further rotate in relation to the disc 4, further varying the degree of coincidence between the slots 3a and 4a. The turning of the disc 3 in relation to the disc 4 caused by movement of the fly weights provides a fuel metering control factor as a function of speed. As the fuel pressure is varied, in dependence on the throttle position by means of the linkage 108 and 107, the quantity of fuel injected is dependent upon the throttle position and engine speed, in accordance with the present principle of the invention and the manner indicated in connection with the embodiment of FIG. 9.

Since the disc 99 is also connected to the throttle linkage, movement of the throttle will not only cause a change in the fuel pressure by movement of the rod 108, but will also cause a movement of the roller bearing 101 with its race 102. Movement of this roller bearing and race will act on the roller 104 of the cam follower, causing the cam follower to move in the direction normal to the axis of rotation of the shaft 13, and thus changing the position of contact of the wheel 96 with the three dimensional cam 93, in a radial direction. A change in the throttle position will, therefore, not only cause a change in fuel pressure, but will change the response of the centrifugal governor in varying the degree of coincidence between the slots 3a and 4a. By a suitable dimensioning of the three dimensional cam 93, the response of the governor influencing the degree of coincidence between the slots 3a and 4a may be so varied that the exact fuel metering requirements indicated in FIGS. 5a and 8 may be obtained over the entire engine speed at load range, thus providing an extremely accurate control. The distributor shown in this embodiment, therefore, not only provides separate introductions of the individual control effects based on engine speed and load or throttle position, but allows an additional combination of these control factors to vary the speed control influence, not additionally or proportionally, but in a manner adapted to the special requirement of the engine in conjunction with which the device is used. For each speed and throttle position over the entire operating range of the engine, the roller 96 will contact the three dimensional cam 93 at an exactly defined point. Each one of these points will, therefore, represent a specific throttle position at a specific engine speed. The exact fuel pressure at any specific point, is, of course, known, since the fuel pressure is determined by the throttle position. The exact thickness which the cam must have at each point may, therefore, be readily calculated from the engine characteristic curves, such as curves of FIGS. 5a and 8, and the exact shape of the cam determined. The device and cams should preferably be so designed, that the main relative turnings of the discs 3 and 4 is effected by the centrifugal governor as a function of the speed and that the supplemental turning caused by a changed position of contact of the wheel 96 and three dimensional cam 93 is as small as possible.

The fuel quantity for the best air-fuel ratio is also, of course, dependent upon the temperature and pressure of the air, and the curves, as, for example, as shown in FIGS. 5 and 8 are for given air temperature and pressure, which may, for example, be the average temperature and pressure which would normally be encountered by the engine in operation.

For a very exact control, however, compensation may be provided for variation in the air temperature and pressure. In FIG. 30 a bellows or aneroid box 109 connects the rod 108 to the cam 107. This bellows or aneroid box 109 is hermetically sealed under, for example, a slight vacuum, and is maintained in contact with the influences of the ambient temperature and pressure. Changes in the ambient temperature, i.e., the temperature of the air supplied to the engine, will change the pressure of the air entrapped in the bellows, causing an expansion or contraction thereof, and thus a corresponding expansion or contraction of the bellows. With an expansion or contraction of the bellows, the length of the lever arm to the pivot point of the cam 107 will change, thus causing a proportional change of the actuation effect of the throttle through the rod 108 on the cam 107. Similarly, changes in pressure will cause an expansion or contraction of the bellows 109. With decreasing air pressure, as, for example, with increasing altitude and/or with increasing temperature, the bellows expands. This will lessen the injection pressure at a constant travel of the rod 28, resulting in a smaller injected quantity corresponding to the altitude and temperature conditions. This allows extremely exact control with compensation for variation in altitude and temperature conditions.

By the magnitude of the pressure in bellows 109, i.e., the magnitude of the vacuum, the extent of the temperature correction can be influenced. For instance, if bellows 109 contain an absolute vacuum, then no temperature influence is present. On the basis of experience with engine tests, the magnitude of the vacuum must be so adjusted that the temperature change takes place with an exponent of about .7 (T).

The embodiment as shown in FIGS. 32 and 33 is identical in structure and operation to the embodiment as shown in FIG. 30, except for the mechanical linkage by which the fuel pressure is varied in dependence on the throttle position, and by which compensation is made for variations in the ambient air pressure and temperature.

The rod 110 is mechanically connected for actuation by the throttle linkage, so that a change in the throttle position causes a pivoting or swinging of the rod 110. An arc segment 111, acting as a cam, is connected to the rod 110. Pivoting of the rod 110 causes the segment 111 to act on the transverse rod 112, causing the same to slide in the slot in which the same is positioned. Connected to the rod 112, is the beam 113, which pivots at the pivot point 115. Movement of rod 110, therefore, causes the beam 113 to pivot about its pivot point 115. The follower wheel 114 of the member 25 of the valve 21, is maintained in contact with the beam 113, so that upon pivoting of the beam 113, the force of the spring 24 is correspondingly increased or decreased varying the pressure at which fuel will be passed through the device, by varying the pressure at which valve 21 will lift, allowing fuel to be bypassed back to the pump through the conduit 23, in the same manner as in connection with FIG. 30. The pivot 115 of the beam 113 is connected by a connecting rod 116 to the hermetically sealed bellows 117, which may, for example, be maintained under a reduced pressure. The bellows 117 is subjected to the pressure and temperature influences of the ambient air being supplied to the engine. With an increase in temperature or on the other hand a decrease in the pressure of the air, as for example, caused by increase in altitude, the bellows 117 will expand, causing a corresponding change in movement of the pivot 115, and thus changing the lever ratio of the beam 113, acting on the wheel 114 and its member 25. The effect of the throttle position on the injected fuel pressure is, therefore, proportionally changed with a change in the pressure and temperature of the ambient air compensating for the change in the specific weight of the air, in the same manner as the fellows 109 of FIG. 30, effects this compensation.

In this connection, it must be noted that the influence which the change in the specific weight of the air exerts on the fuel pressure through the action of the bellows 109 and 117, cannot be additive or subtractive to the action exerted by the change in the throttle position, but must cause a proportional change in the effect that the throttle position has on the fuel pressure.

In all other respects, as mentioned, the structure and operation of the device of FIG. 32 is identical to that described in connection with FIG. 30.

FIG. 34 shows the embodiment of FIG. 32, in operational position, on an ignition type integral combustion engine, and in particular, on a four cylinder automotive engine. In FIG. 34, the parts of the engine are given reference numerals corresponding to those of FIG. 9.

As shown, the distributor is mounted at the rear of the engine block, and is driven by the crank shaft, through a timing chain, in the same manner as the cam shaft of the engine, but at half the engine speed. The fuel line 118, leads from the gas tank to a constant pressure fuel pump 119, of conventional construction, which, for example, is driven by a rocker arm actuated by a cam driven by the crank shaft of the engine. A fuel line 120 connects the inlet connection 107a into the distributor to the pressure side of the pump, while the fuel return conduit 23, controlled by the valve 21, leads back to the intake side of the pump. The individual fuel lines 17 connected with the orifices 12 in the distributor, lead to the injection nozzles 18, which extend directly into the individual cylinders of the engine or intake manifold. The injection nozzles 18 may be of any conventional construction, and are preferably as shown in FIG. 9, provided with a check valve which opens against a spring by the fuel pressure leading from the distributor into the nozzle, and which closes in the reverse direction, to prevent any back forcing effect from the pressure generated in the cylinder. The injection nozzles preferably have the conventional fine spray jets for injecting the fuel into the cylinder in a finely atomized form.

The accelerator pedal 26 is connected to the throttle rod 27, by means of a connecting rod linkage 121, so that as the accelerator pedal 26 is depressed, the throttle valve 27 is opened in the convention manner, allowing a greater quantity of air to be drawn into the intake manifold of the engine. The rod 110 and the disc 99 are also connected to the linkage 121, so that when the accelerator pedal is depressed, the rod 110 will pivot, causing pivoting of the beam 113, changing the pressure of the spring 24, varying the fuel pressure. In the same manner, movement of the rod 121 by the accelerator pedal will cause movement of the disc 99, varying the radial position of contact of the wheel 96, with the three dimensional cam 93, as previously described. As the shaft 13 of the distributor is rotated at half the engine speed by means of the timing chain, as previously described, the degree of coincidence between the slots 3a and 4 varies with the engine speed, so that the amount of fuel passed through each individaul fuel line 17 and through each injection nozzle, into each cylinder for combustion on each power stroke, is controlled as a function of the engine speed and throttle position, with the metering control based on the engine speed, additionally being varied as a function of the throttle position, so that the exact engine requirements as to fuel quantity over the entire speed and load range are accurately attained. The bellows 117 is subjected to the pressure and temperature of the air supplied to the engine through the manifold and will thus provide a compensation for any change in the specific weight of the air. For a more exact functioning of this bellows 117, the same should preferably be positioned as close to the air intake of the manifold as is practical. This may be effected, for example, by a physical adjacent positioning of this element next to the manifold air intake, or by providing a remote sensing device at the air inlet.

The embodiment as shown in FIGS. 35 and 36, is identical in structure and operation to the embodiment shown in FIGS. 30 and 32, except that the compensation for the change in the specific weight of air is effected by having a bellows or aneroid box effect a relative turning of a disc 16 with the orifices 12a, with respect to the member having the orifices 12, thus varying the degree of alignment between the orifices 12 and 12a.

The fuel pressure is controlled by the lever 123, actuated by the throttle linkage, acting on the wheel 114, which varies the pressure of the spring 24, on the bypass valve 21, in the identical manner as described in connection with the previous embodiment. The orifices 12a are defined through a turnable disc 16, corresponding, for example, to the disc 16 of FIG. 13. The disc is connected to a shaft 29, which in turn is connected to a lever arm 28, which is actuated by the aneroid box or hermetically sealed bellows 122, corresponding to the bellows 109 of FIG. 30, or the bellows 117 of FIG. 32. The bellows 122 may, for example, be maintained under a slight vacuum, so that changes in the ambient air pressure and/or temperature, indicating a change in the specific weight in the air, will cause an expansion or contraction of the bellows, and thus, a limited rotation of the shaft 29, by actuation of the lever arm 28. The shaft 29 causes a limited rotation of the disc 16, thus varying the degree of alignment between the orifices 12 and 12a, and thus varying the amount of fuel metered under any given operational conditions, compensating for the change in specific weight of the air. With the embodiment of FIG. 35, the discs 3, 4, and 16, preferably have orifices and slots corresponding to those shown in connection with FIGS. 23 and 24. In this embodiment, the change in the specific weight of the air is introduced as a separate control factor, rather than proportionally varying the response to the throttle position, as in the previous embodiments.

In the embodiment as shown in FIGS. 37 and 37a, the shaft 13, rotates in the housing 1, on ball and roller bearings. Connected to the shaft 13, for rotation therewith, are the flanges 124 and 125. Two opposed flyweights 126, are pivotably connected to the flanges 124 and 125, by means of the pivot pins 127. The flyweights are resiliently urged toward each other by means of the springs 128, but upon rotation with the shaft 13, centrifugal force will tend to cause the same to pivot apart about the pins 127, against the force of the springs 128. One of the flyweights 126 has a pin 129 connected thereto. A bent lever arm 130 is pivotably mounted on the pin 129. The bent free end of the lever arm 130 has a cam follower wheel 131, which engages the tapered inner race of a roller bearing 132. The roller bearing 132, may be moved axially with respect to the housing, by means of the rod 133. Due to the tapered shape of the inner race of the bearing 132, axial movement thereof will act on the wheel 131, causing a pivoting of the crank arm 130, about the pin 129, with the degree of pivoting being proportional to the axial movement of the bearing 132. The lever arm 130, has a pin 134, connected thereto, which rides in an arced slot 135 of a flange or disc 136. The flange or disc 136 forms an end portion of the sleeve 137, through which a narrowed portion 138, of the shaft 13 extends. The portion 138, and the sleeve 137, may be rotated relative to each other, and the distributing disc 4 is connected to the sleeve 137, while the distributing disc 3 is connected on the end of the portion 138 of the shaft 13.

As the shaft 13 is rotated in synchronisation with the engine, as described in connection with the previous embodiment, the disc 3 rotates therewith. Due to the engagement of the pin 134 in the slot 135, the rotation of the flyweights 126 with the shaft, will cause the flange 136, and thus the sleeve 137, and the disc 4 to also rotate with the shaft 13, so that the slots 3a and 4a intermittently establish flow communication between the various aligned orifices 12a and 12, as previously described. As the speed of rotation increases centrifugal force will cause the flyweights 126 to pivot outwardly about the pivots 127, against the force of the springs 128. Pivoting of the flyweights causes a movement of the pin 129 and thus movement of the lever arm 130. Movement of the lever arm 130, due to the engagement of the pin 134 in the slot 135, causes a limited rotation of the flange 136, and thus the sleeve, 137, with respect to the shaft 13. The disc 4 is thus caused to rotate a limited amount, with respect to the disc 3, varying the degree of coincidence between the slots 3a and 4a, and thus varying the fuel metering as a function of engine speed. The variation in the quantity of fuel metered in accordance with the throttle position, may be effected by varying the fuel pressure in the manner described, for example, in connection with the embodiment of FIG. 9. Movement of the rod 133, and thus the bearing 132, will cause a pivoting of the lever arm 130, about the pin 129, and thus varying the point of contact of the pin 134, with the slot 135. The variation of this point of contact will, therefore, vary the transmission ratio from the pivoting movement of the flyweights 126, to the relative turning of the disc 4 with respect to the disc 3. By additionally connecting the rod 33 to the throttle of the engine, fuel metering is not only controlled as a function of engine speed and throttle position, but additionally, the transmission ratio of the effect of the flyweight on the disc 4 is varied, so that the control effect based on the engine speed is varied in accordance with the throttle position. The shape of the curved slot 36, as well as the characteristic of the centrifugal governor, may be adapted to the respective requirements of the engine, so that the ideal fuel metering requirements over the entire speed and load range may be fairly closely approximate. While the control is not as accurate as may be obtained with the three dimensional cam, as described, for example, in connection with the previous embodiments, the control effect is more accurate than could be obtained if the throttle control influence did not additionally effect the control function, based on speed.

In the embodiment shown in FIGS. 38, 38a and 38b, a governor housing 152 is rotatably mounted on ball bearings within the distributor housing 1. The shaft 13 which is connected for rotation and synchronization with the engine forms an extension of this governor housing. A pair of opposed fly weights 153 and 154 are slideably mounted in the governor housing on the pins or shafts 155 so that the same may slide outwardly, away from each other, against the force of the springs 156 and 157, due to centrifugal action upon rotation of the governor housing 152. The fly weights 153 and 154 have holes for bores through which the pins 155 extend and which allow the fly weights to slide outwardly or inwardly along the pins. The fly weights 153 and 154 are connected to each other by means of a lever arm arrangement 158 and the pins 159. The lever arm arrangement 158 may rotate freely on the inner shaft 160, and is connected to the pins 159 by slots on its ends so that the outward and inward movement of the fly weights 153 and 154 with respect to each other will be maintained uniform. A segment 161 is rigidly connected to the end of the inner shaft 160. The fly weight 153 is connected to the segment 161 by means of a lever arm 162. The lever arm 162 is pivotably connected to the fly weight at one end by means of a pin 163 and connected to the segment 161 at the other end by means of a pin 164 which extends into an arched slot 165 in the segment. Movement of the fly weight 153 toward or away from the axis of rotation of the governor housing 152 will, through the action of the lever arm 162 cause the segment 161 and the inner shaft 160 connected thereto to turn in relation to the governor housing 152. The transmission ratio of movement of the fly weight to the turning of the segment, however, depends upon the position of the pin 164 in the slot 165.

Thus, for example, when the pin 164 is at the end 166 of the slot 165 the ratio is very low or zero, so that a large outward movement of the fly weight 153 will cause little or no turning of the segment 161. Conversely, when the pin 164 is at the opposite end of the slot, the transmission ratio is relatively high, so that movement of the fly weight 153 will cause a relatively large turning movement of the segment 161.

The position of the pin 164 in the slot 165 is controlled by the piston 168 and double armed lever 167 which pivots about the pin 169. The piston 168 is positioned in a cylinder arrangement 170 which is also rigidly connected to the inner shaft 160.

The distributing disc 4 is connected on an extension of the governor housing 152 and the distributing disc 3 is connected to the end of the inner shaft 160. The fuel is pumped into the housing, in front of the disc 8 and the fuel pressure may be controlled in accordance with the throttle position in the manner described, for example, in connection with the embodiments of FIG. 9 or FIG. 30. The pressure of the fuel passed in in front of the disc 8 is communicated to the piston 168 by means of the passage 171, extending through the inner shaft 160 in communication with the cylinder 170. This fuel pressure forces the piston against the action of the spring 172.

In operation, the distributor is connected to the engine in the manner described in connection with the previous embodiments. The shaft 13 and governor housing 152 are rotated in synchronization with the engine, and as the engine speed increases, the centrifugal force tends to slide the fly weights 153 and 154 outwardly against the pressure of the springs 156 and 157. The distributing disc 4 rotates with the governor housing 152 and the inner shaft 160 with the distributing disc 3 is also caused to rotate with the governor housing 152 due to the connection of the segment 161 to the fly weight 153. At any given fuel pressure corresponding to give throttle position, the pin 164 will remain at a fixed position in the slot 165 so that as the engine speed increases at this fixed throttle position and fuel pressure, the outward movement of the fly weights cause a corresponding rotation of the segment 161 and the shaft 160 and thus, a relative turning of the disc 3 to the disc 4 in dependence on the engine speed, varying the degree of coincidence between the slots 3a and 4a in dependence on the engine speed. As the fuel pressure is changed corresponding to a change in throttle position or load, the same will cause an actuation of the piston 168 causing the position of the pin 164 and slot 165 to vary and thus varying the transmission ratio between the movement of the fly weights and relative rotation of the disc 3 with respect to the disc 4. The amount of fuel metered will therefore not only vary in dependence on the engine speed and throttle position, but a different response in dependence on speed may be had for each throttle position corresponding to a different load. The distributor of this embodiment may therefore be used in connection with engines having characteristic curves of the type shown in FIG. 5a in which, however, the curves for each of the various throttle positions are not parallel or approximately parallel to each other, but which may, for example, vary from each other in the degree of slope.

The embodiment of the distributor is shown in FIG. 9, and the corresponding embodiments in which the metering is solely effected as a function of engine speed and throttle position with the metering in accordance with the speed response being substantially the same over the entire load range, are best suited for engines having characteristics in which the curves corresponding to FIG. 5a for each throttle or load position are approximately parallel to each other.

The embodiment corresponding to FIGS. 30 to 36 with the three dimensional cam will provide the exact fuel metering requirement over the entire load and speed range, irrespective of the characteristics of the particular engine and may be used, for example, in connection with engines in which the curves of the various throttle or load positions vary widely from one another and/or have an irregular curvature difficult to approximate by governor response alone.

When controlling the injected quantity of fuel by a relative turning of the two rotating distributing discs 3 and 4 to vary the degree of coincidence between the slots 3a and 4a, the exact point in the cycle at which the injection event commences or terminates, remains fixed, depending upon the direction of relative rotation between the disc. Thus, when one of the discs is turned relative to the other disc in one direction, the injection event will always commence at a fixed given point in the cycle, but the point of termination of the injection event will vary depending upon the relative degree of turning between the disc. Conversely, when the relative turning of the disc, with respect to the other disc, is effected in the opposite direction, the point at which the injection events terminates in the cycle will remain constant, but the point which the event commences will vary, depending upon the degree of relative turning between the disc.

The embodiment as shown in FIGS. 39, 40, and 40a allows a control in the timing of the injection event, without effecting the quantity control, and allows a stepwise advancing of the point at which the injection event will commence in the cycle. As shown in FIG. 39, the rotating distributing discs 3 and 4, in addition to the slots 3a and 4a, have additional slots 3b and 4b, positioned at a different radial distance from the axis of rotation of the disc. The disc 8 has, in addition to the orifice 12a, a further orifice 139a, positioned at the same radial distance from the axis of rotation as the slots 3b and 4b, and the end member has, in addition to the orifice 12, a further orifice 139, also positioned at the same radial distance from the axis of rotation as the orifice 139a and the slots 3b and 4b. The orifices 139 and 139a are in axial alignment as are the orifices 12 and 12a. The orifices 12 and 139 each lead into a common channel, leading to fuel line 17. The distributing discs 3 and 4 rotate in a counter-clockwise direction, and the slots 3b and 4b are advanced with respect to the slots 3a and 4a, in the direction of rotation of the disc. In order to effect the fuel metering as a function of speed, the disc 3 is turned clockwise with respect to the disc 4, as the engine speed increases, as shown by the dotted arrow. The normal direction of rotation of the discs 3 and 4 are shown by the solid arrows.

At idling speed, the slots 3a and 4a just overlap, allowing communication from the orifices 12a to the orifice 12. At this speed, the orifices 3b and 4b do not overlap, so there is no communication established between the orifice 139a and 139. The relative positioning of the slots are shown in FIG. 40 at this low speed. As the speed of the engine increases, the degree of coincidence between the slots 3a and 4a increases but the point at which the injection event occurs remains constant. As the normal speed range is approached, there is a complete overlapping of the slots 3a and 4a, and the slots 3b and 4b begin to overlap as shown in FIG. 40a. At this point, flow communication is additionally established between the orifices 139a and 139, as the slots 3b and 4b in coincidence with each other, pass in communication with these orifices. As slots 3b and 4b are advanced with respect to the slots 3a and 4a, the injection event is correspondingly advanced, and occurs at an earlier point in the cycle. As the slot 3a has a greater length than the slot 4a, once the rear edge of the slot 3a has moved in alignment with the rear edge of the slot 4a, further clockwise relative movement of the disc 3 with respect to the disc 4, will not cause a change in the effective slot length 3a and 4a. It is at this point that the slots 3b and 4b begin to overlap and coincide. The further relative movement of the disc 3, with respect to the disc 4, at further increasing speed, only causes an increase in the through flow area with respect to the slots 3b and 4b, and not with respect to the slots 3a and 4a, so that the variation in the injected quantity remains uniform, as if, for example, there are only slots 3a and 4a having longer slot of uniform size.

FIG. 41 shows the injected quantity of fuel plotted against the injection timing. The injected quantity is plotted on the ordinate, and the injection timing on the abscissa in relation to the crank shaft angle. As may be noted, at idle speed as shown by the dotted lines, the injection only commences at the point a. As the speed increases, the injection will still commence at point a, but will terminate at an increasingly further retarded point until the normal speed range occurs. At this normal speed range as shown by the solid lines, the slots 3b and 4b come into play, and a second injection event occurs, beginning at the point b, with the injection event caused by the slots 3a and 4a, remaining constant as to timing. At a further increase in speeds, the point of commencement of the injection event remains constant at 6, but the point of termination is further and further retarded. until the same passes point a, i.e., does not terminate until after injection caused by the slots 3a and 4a commences as shown by the chain dotted line, indicating maximum speed.

In place of two groups of slots and orifices, any further number of slots and orifices may be provided, so that the exact point for commencement of the injection event may be advanced stepwise, with each stepwise increase occurring at a given increased engine speed.

The use of two or more orifices and slots, at different radial lengths from the axis of rotation may also be used to obtain a mixture stratification in the engine cylinders, and thus improve the knock limits. In this case, the slots must be so dimensioned and positioned to provide the desired fuel quantities in several injection events, always maintaining, for example, a fuel quantity corresponding to the air quantity for ideal spark ignition in the area of the spark plug, by one of the injection events to insure the initiation of the combustion event by the spark and ignition of the other fuel quantities injected in the other injection events, caused, for example, by the different slots.

This stratification permits the establishment with the first injection of a lean average mixture in the cylinder which reduces the knock tendencies. The known qualities of a rich mixture are obtained with a second injection which establishes a rich mixture in the neighborhood of the sparkplug. This known method, which permits an increase in the output by means of increasing the compression (because of the improved knock qualities), and permits a decrease in the fuel consumption, can therefore be realized with the distributor system of the invention in a particularly simple way.

In initially running a cold engine, and when operating the engine until it reaches its normal operating temperature, it is often desirable to provide a richer mixture. This may be effected, in accordance with the present invention, by providing a conventional choke valve in the air inlet to the manifold, or by providing means at the distributor itself for over-riching the mixture.

When a conventional choke is used, the same may have the conventional construction and may be manually or automatically, for example, thermostatically controlled.

The over-riching of the mixture may be effected at the distributor itself in various different manners. Thus, for example, when the orifice 12 is positioned in a turnable disc 11, as shown in FIG. 13, this disc 11 may be turned by a manual or by a thermostatic control, controlled by the engine temperature, as, for example, the temperature of the water jacket of the engine, so that at an initial cold temperature, the orifices 12 and 12 are in axial alignment and as the engine warms, the disc 11 is rotated to bring the orifice 12 more and more out of alignment with the orifice 12a, relatively decreasing the quantity of fuel over the entire operating range, and thus decreasing the initial cold running richness.

Where the fuel quantity is controlled by variation of the fuel pressure, the fuel pressure may, for example, be initially increased, until the engine has reached its operating temperature. In the embodiment as shown in FIG. 32, the pivot for the rod 110 is eccentrically mounted on the disc 140, which may be rotated by the lever 141. Lever 141 may be controlled manually, or by a thermostatic spring, controlled, for example, by the temperature of the water jacket of the engine. Upon movement of the lever 141, the disc 140 is rotated, varying the pivot point for the rod 110, therefore providing an overall increase or decrease of the fuel pressure over the entire operating range, allowing for an increase in the mixture of richness, until the engine has heated up. A similar disc 140 and lever arm 141 is shown in FIG. 34, for controlling the pivot point of the cam 123.

The pump such as the pump 119 of FIG. 34, which pumps the fuel through the distributor to the injection nozzles must, of course, be capable of generating sufficiently high pressures to effect the injection through the nozzles, and thus, must be a high pressure pump.

When initially cranking the engine to start the same, a number of engine revolutions are generally required until the pressure of the fuel is raised by the pump a sufficient amount to be sprayed through the injection nozzles for the injection.

In order to avoid this disadvantage and to allow a quick starting of the engine, the fuel under the high pressure may be stored in an auxiliary reservoir, and released through the distributor upon the cranking of the engine in order to supply fuel to the nozzles at sufficient pressure for the initial starting until the high pressure pump driven by the engine has built up its pressure.

As diagrammatically shown in FIG. 42, the fuel is supplied from the gas tank through the fuel line, to the high pressure pump, as, for example, by means of an electric low pressure pump. From the high pressure pump, the fuel is pumped through the distributor to the fuel lines 17 leading to the injection nozzle. A reservoir space 142 is connected to the distributor by means of a valve 143. As the fuel is pumped by the high pressure pump through the distributor, same will force the valve 143 open against its biasing spring, so that the fuel, under pressure, is forced from the distributor into the reservoir space 142, until pressure equalization is reached and a quantity of fuel is maintained in the reservoir 142 under the pressure normally generated by the high pressure pump during operation. The fuel will be maintained in this reservoir under this pressure, even after the engine and the high pressure pump has been stopped due to the closure of the valve 143. When initially starting the engine, the valve 143 is forced open by the lever arrangement 144, connected to the starter, so that the fuel under pressure will flow from the reservoir 142 through the distributor to the injection nozzles providing for the injection until the high pressure pump has had an opportunity to build up its pressure. Alternately, of course, a separate valve may be provided from the reservoir space 142 into the distributor which is automatically opened upon operation of the starter, allowing the fuel to flow therethrough, the valve 143 solely serving the function to allow the filling and pressurization of the reservoir. With this embodiment, instantaneous starting may be achieved, without it being necessary to wait for the number of engine revolutions normally required for the high pressure pump to build up its pressure.

In the embodiment as diagrammatically shown in FIG. 43, the fuel is pumped from the gas tank by a low pressure pump to the high pressure pump, and from the high pressure pump through the distributor and individual lines 17 to the individual injection nozzles 18. The gas line leading from the low pressure pump to the high pressure pump, has a branched portion 145, which leads to a separate injection nozzle 146, positioned in the air inlet line to the intake manifold of the engine. A shut-off valve 147 which is connected to the engine starter is positioned in this branch gas line 145. The low pressure pump is preferably an electric pump which is immediately started upon turning on the ignition of the engine, thus pumping gas to the high pressure pump and through the line 145 to the valve 147. Upon actuating the electric starter of the engine, the shut off valve 147 is opened, so that the gasoline from the low pressure pump instantaneously flows through the injection nozzle 146 and is carried through the intake manifold to the cylinders of the engine, allowing instantaneous starting even before the high pressure pump has built up sufficient pressure to allow injection through the nozzles 18. When the starter motor is stopped, the shut off valve 147 is automatically closed so that the injection nozzle 146 does not operate and the supplying of fuel to the engine is effected in the desired manner, through the injection nozzle 18.

In order to insure accurate injection nozzle operation over the entire operating range of the engine, the nozzles should be precision machined. When manufacturing the nozzles with the usual production tolerances, the manufacturing inaccuracies may tend to detrimentally affect operation when relatively small quantities of fuel are injected in the idling range of the engine. In order to overcome this disadvantage, and to allow the use of wider tolerances in the manufacture of the nozzles, an auxiliary device may be provided to supply a portion of the fuel to the cylinders during idling.

As shown in FIG. 44, a supplemental injection nozzle 148, is provided which leads into the air inlet to the intake manifold adjacent to the throttle valve. This auxiliary nozzle is connected to the low pressure pump which also pumps the gasoline from the tank to the high pressure pump. The nozzle 148 has a closure valve 149, which is normally biased closed by the spring 150. The pressure of the spring 150 is so chosen that the fuel pressure from the low pressure pump will force the same open, allowing injection of a quantity of fuel into the manifold at a certain predetermined manifold vacuum which occurs in the idling range when the throttle valve is in its closed position. The fuel injected will, of course, be carried along the inlet manifold through the intake valves to the cylinders of the engine, allowing a smooth idling of the engine, even with large injection nozzle tolerances.

The embodiment as shown in FIG. 45 is identical to that shown in FIG. 43, except that in place of the injection nozzle 148 being controlled by the manifold vacuum, the same is controlled by a shut-off valve 150, which is connected to the throttle valve linkage, and which opens when the throttle valve is released to its closed or idling position. With the valve 151 opened, with the throttle valve in its idle position, fuel will be pumped by the low pressure pump through the nozzle 148, assuring smooth idle operation, even with large injection nozzle tolerances. In place of the valve 151 being controlled by a linkage directly connected to the throttle linkage, same may be controlled by a vacuum device which operates off the manifold vacuum, or by a combination of the two.

In addition to its use as a component part of the novel fuel injection system, in accordance with the present invention, for ignition type piston engines, the distributor per se is novel, and has a wide field of utility as a fuel metering device and distributing device for various other engines, such as various other internal combustion engines and as a hydraulic metering control device for various functions. The distributor, for example, is suitable for use in combination with other types of internal combustion engines, such as diesel engines, gas turbines, jet engines and for hydraulic control of machine tools.

Gas turbines require an exact metering of small fuel quantities in dependence on a number of control factors and other influences, such as turbine speed, load conditions, ambient atmospheric conditions and control requirements resulting from operational necessities. The distributor, in accordance with the invention, is excellently suited for meeting these requirements, and for example, metering the fuel in dependence on turbine speed, load conditions, ambient atmospheric conditions, and other control requirements. In particular, embodiments as shown in FIGS. 30, 32 and 35 with the three dimensional cam is excellently suited for this function, as the same not only permit separate introduction of individual control factors, but also a two dimensional combination of these control influences which is adapted to the special requirements of the power plant. The speed factor which is of importance in turbine control may be taken care of by the centrifugal governor arrangement and the overall control may be effected with relatively little variation in the pressure of the fuel in the pressure line to the spray nozzles, with the variation of the load, at steady speed being accomplished by changing the fuel air mixture ratio which changes the combustion temperature. The manner in which the variations in speed control the fuel metering with the distributor, in accordance with the present invention, allows a short injection time during idle so that a correspondingly higher fuel pressure may be used. The distributor, in accordance with the invention, allows a control with a variation of the fuel pressure, only within that range at which a detrimental effect on the atomization of the fuel and the maintaining of the desired fuel-air ratio will not occur. The distributor, furthermore, allows the maintaining of the ideal fuel to air mixture, in the speed ranges at which this mixture is particularly critical, and at which variations may cause engine failure.

The distributor, in accordance with the present invention, is also well suited for use in connection with airplane jet engines, allowing adequate fuel pressure and accurate fuel control, with respect to the air mixture, thus avoiding the danger of flame-out, which so often conventionally occurs, when the jet engine is throttled down with the plane operating at a high altitude and speed.

In most conventional systems the fuel metering for jet engines is effected by varying the fuel pressure with constant injection. When using the distributor, in accordance with the present invention, intermittent injection is possible which allows the maintaining of a predetermined minimum pressure suitable for atomization, even at engine idle. With the fuel distributor, in accordance with the present invention, it is not only possible to effect the metering with intermittent injection and with a change in the interval of injection, but, in accordance with the conventional mode of operation, by a change in the fuel pressure, and/or by a combination of the injection interval and fuel pressure. With the distributor, over speed, compressors stall and overheating in the combustion chamber may be reliably avoided.

The distributor, in accordance with the present invention, and in particular, the embodiments with the three dimensional cam, is excellently suited for the regulation system of machine tools. Thus, for example, the distributor in accordance with the present invention, may be used for the control of automatic lathes, duplicating, milling and cutting machines.

While I have disclosed several embodiments of the present invention, it is to be understood that these embodiments are given by example only and not in a limiting sense, the scope of the present invention being determined by the objects and the claims.

I claim:
1. In a fuel injection system for an internal combustion engine provided with at least one piston and cylinder, an air inlet conduit communicating with said cylinder, a throttle valve for said air inlet conduit, a fuel injection nozzle positioned to supply fuel to said cylinder, a fuel pressure line leading to said nozzle, and a spark ignition system; the improvement in intermittent variable flow fuel supply means comprising a substantially pressure-tight housing having a plurality of housing walls and including a first member having an orifice therethrough which forms a portion of a passageway connected with said injection nozzle fuel pressure line, a second member mounted in said housing in spaced relationship to said first member, said second member having an orifice therethrough corresponding to said orifice through said first member to form another portion of said passageway to said pressure line, a pair of distributing discs rotatably positioned in said housing between said members, said distributing discs having an opening therethrough positioned for mating with and flow communicating said orifices upon rotation to complete the passageway to said pressure line, means for rotating said distributing discs in synchronization with the rotation of said engine, means for supplying fuel under pressure to said passageway, and means for varying the quantity of fuel passing through said passageway upon each mating of said orifices with said distributing discs opening, said means for varying the quantity of fuel being responsive to the speed of engine rotation and the position of said throttle valve, and independent of a sensing of the air flow to said cylinder.

2. Improvement, as set forth in claim 1, in which separate means are provided for varying the quantity of fuel passing through said orifices in dependence on the engine speed and throttle position.

3. Improvement as set forth in claim 2, in which said distributing discs are rotatable together, and having coinciding openings defined therethrough, positioned for mating and flow communicating said orifices, and in which said means for varying the quantity of fuel in dependence on the engine speed, includes centrifugal governor means for adjusting the relative rotational position between said distributing discs, in accordance with the rotational speed thereof, to thereby vary the degree of coincidence between their openings.

4. Improvement, as set forth in claim 1, wherein said engine is provided with a multiple number of pistons and cylinders, an intake manifold for said cylinders, said means for supplying fuel under pressure includes a high pressure pump driven by said engine, and including a low pressure pump for supplying fuel to said high pressure pump, and means for passing fuel from said low pressure pump into said manifold upon the starting of the engine.

5. Improvement, as set forth in claim 4, in which said last mentioned means includes a jet nozzle positioned adjacent said throttle valve.

6. Improvement, as set forth in claim 1, wherein said engine is provided with a multiple number of pistons and cylinders, an intake manifold for said cylinders, said means for supplying fuel under pressure includes a low pressure pump, and means connected to said throttle valve for supplying fuel from said low pressure pump to said manifold when said throttle valve is in its idle position.

7. Improvement, as set forth in claim 6, in which said last mentioned means includes a jet nozzle positioned in said manifold adjacent said throttle valve.

8. Improvement, as set forth in claim 1, in which said means for adjusting the relative rotational position between said distributing discs is centrifugal governor means including a governor housing containing at least one fly weight, a helix threaded spindle connected to said fly weight for axial movement upon outward movement of said fly weight, one of said distributing discs being connected for rotation with a sleeve having a helix threaded portion in engagement with said spindle, the other distributing disc being connected for rotation with said governor housing.

9. Improvement, as set forth in claim 1, wherein said first member defines a multiple number of annularly positioned orifices therethrough, and means responsive to the engine temperature for proportionally increasing the quantity of fuel passing through said orifices at cold engine temperatures.

10. Improvement, as set forth in claim 1, in which said means for supplying fuel under pressure includes a high pressure pump driven by said engine, including a reservoir for storing fuel under pressure, wherein said first member defines a multiple number of annularly positioned orifices therethrough, said second member having orifices therethrough corresponding to said orifices through said first member, and means for passing fuel from said reservoir to said orifices defined through said second member upon starting the engine.

11. In a fuel injection system for an internal combustion engine provided with a multiple number of pistons and cylinders, an intake manifold for the cylinders, an air inlet to said manifold, a throttle valve for said air inlet, a fuel injection nozzle associated with each cylinder, a pressure line leading to each injection nozzle and a spark ignition system, the improvement which comprises a substantially pressure tight housing having a first member defining a multiple number of annularly positioned orifices therethrough, each orifice being connected to a separate pressure line leading to an injection nozzle, a second member positioned in said housing in spaced relationship to said first member and having orifices defined therethrough corresponding to each orifice through said first member, to form another portion of said passageways to said pressure lines, a pair of distributing discs rotatably positioned in said housing between said members, a pair of coinciding openings defined through said discs, positioned for mating with each of said orifices defined through said members upon rotation of said discs, means for rotating said distributing discs together in synchronization with said engine, means for supplying fuel under pressure to said orifices defined through said second member, means for adjusting the relative rotational position between said distributing discs in accordance with the rotational speed of said engine to thereby vary the degree of coincidence between their openings, and additional means for varying the quantity of fuel passing through said orifices in dependence upon the load on said engine.

12. The fuel injection system, as set forth in claim 11, wherein said additional means for varying the quantity of fuel passing through said orifices in dependence upon the load on said engine comprises means responsive to the position of said throttle valve.

13. The fuel injection system, as set forth in claim 12, wherein said last-mentioned means comprises means for varying the engine speed adjustment of the relative rotational position between said distributing discs in dependence on the position of said throttle valve.

14. The fuel injection system, as set forth in claim 13, wherein said means for adjusting the relative rotational position between said distributing disc comprises centrifugal governor means including fly-weights connected for turning actuation of at least one of said discs relative to the other, said means for varying the quantity of fuel comprises means for varying the pressure of fuel supplied to said orifices defined to said second member, and wherein said means for varying the engine speed adjustment of the relative rotational position between said distributing discs comprises means responsive to the pressure of fuel supplied to said orifices for varying the transmission ratio between said fly-weights and said disc.

15. The fuel injection system, as set forth in claim 14, which includes a lever system connecting said fly-weights and said discs, a cylinder having a piston reciprocating therein, a piston actuated by the pressure of fuel supplied to said orifices for varying the transmission ratio of said lever system, and said piston being pivotally connected with said lever system.

16. The fuel injection system, as set forth in claim 12, wherein said means responsive to the position of said throttle valve includes a bellows under partial vacuum.

17. The fuel injection system, as set forth in claim 11, wherein said openings defined through said distributing discs are slots, at least one of said distributing discs has at least one additional opening defined therethrough adjacent to said slot and positioned for mating with the orifices through the adjacent member upon rotation of said disc.

18. The fuel injection system, as set forth in claim 17, which includes a plurality of additional openings, the latter increasing in size in the direction toward said slots, said second member is a turnable disc, and said distributing disc defining said additional openings is the distributing disc disposed adjacent to said first member, and in which said additional openings follow said slot in the direction of rotation of said disc.

19. The fuel injection system, as set forth in claim 11, wherein said additional means for varying the quantity of fuel passing through said orifices in dependence upon the load on said engine comprises means for varying the pressure of the fuel supplied to said orifices defined through said second member, which means includes a fuel by-pass defining a path of flow for fuel from in front of said second member out of said housing and means controlled by the position of said throttle valve for varying the amount of fuel flowing through said by-pass.

20. The fuel injection system, as set forth in claim 19, wherein said means controlled by the position of said throttle valve includes a valve, spring means biasing said valve into closing position, and means for varying the tension of said spring means in dependence upon said throttle valve position.

21. The fuel injection system, as set forth in claim 11, which includes means for varying the quantity of fuel passing through said orifices in dependence upon the engine speed and upon the throttle position, and said varying means in dependence upon the engine speed includes means for additionally varying the quantity of passing fuel for each throttle position corresponding to a different load.

22. The fuel injection system, as set forth in claim 21, wherein said speed responsive means comprises a three dimensional cam, a cam follower in contact with said cam, means for adjusting the position of contact between said cam and said cam follower in dependence on the speed of said engine and the position of said throttle valve, and means actuated by said cam and cam follower for varying the engine speed adjustment of the relative rotational position between said distributing discs, and said means for adjusting the relative rotational position between said distributing discs comprises centrifugal governor means including a fly-weight connected for turning actuation of at least one of said discs with respect to the other, and including means actuated by said fly-weight for adjusting the rotational position of contact between said cam and said cam follower, and means for varying the radial position of contact between said cam and said cam follower, in dependence on the position of said throttle valve.

23. The fuel injection system, as set forth in claim 22, in which said centrifugal governor includes a governor housing rotatable about the same axis of rotation as said discs with one of said discs connected for rotation therewith, a pair of opposed fly-weights pivotably mounted in said governor housing for outward pivoting by centrifugal force upon rotation of said governor housing, means resiliently biasing said fly-weights together, a shaft extending axially into said governor housing and connected for rotation with said either disc, a helix threaded member mounted for limited axial movement and connected to said fly-weights for turning actuation upon riveting of said fly-weights, a helix thread connected to said shaft and in threaded engagement with said helix threaded member, said three dimensional cam being connected to said helix threaded member for movement therewith and facing in the axial direction of said shaft, a second shaft connected to said governor housing for the rotation thereof, said cam follower including a support member slidably extending transversely through said second shaft, and means for varying the degree of extension of said support member from said shaft in dependence on the position of said throttle valve, in which said cam follower is a substantially T shaped follower, having a follower wheel at one end of the T in contact with said cam, and in which said means for varying the degree of extension of said support member includes an axially movable bearing having a substantially conically shaped race in contact with the end of said T shaped cam follower opposite said follower wheel.

24. The fuel injection system, as set forth in claim 11, wherein said first member defines a second group of orifices annularly positioned at a different radial distance from the axis of rotation of said disc than said first-mentioned orifices, said second group of orifices has an orifice for each orifice of said first-mentioned group connected to the same pressure line as the orifice of said first group, said second member has a second group of annularly positioned orifices defined therethrough with an orifice corresponding to each orifice of said second group of orifices through said first member, said distributing discs have a second pair of coinciding openings defined therethrough, for mating with each orifice of said second group upon rotation of said discs, and wherein said means for supplying fuel under pressure comprises means for supplying fuel to all of said orifices defined through said second member.

25. The fuel injection system, as set forth in claim 24, wherein one of said first and second pair of openings defined through said discs is advanced with respect to the other pair.

26. The fuel injection system, as set forth in claim 11, wherein said additional means for varying the quantity of fuel passing through said orifices in dependence upon the load on said engine comprises means for varying the pressure of the fuel supplied to said orifices defined through said second member.

27. The fuel injection system, as set forth in claim 11, wherein said first and second members are each turnable discs, said distributing discs and said second member are positioned in said housing for limited axial movement, spring means positioned for resiliently urging said second member towards said first member, said distributing discs are dimensioned to define an outer annular portion of greater cross-sectional thickness than the inner portion, and individual means for turning each of said discs to vary the degree of alignment between said orifices.

28. The fuel injection system, as set forth in claim 11, wherein at least one of said first and second members is a movable member, and wherein said means for varying the quantity of fuel comprises means for moving said movable member to adjustably vary the degree of alignment between said orifices defined through said first and second members.

29. The fuel injection system, as set forth in claim 11, wherein said means for adjusting the relative rotational position between said distributing discs comprises a centrifugal governor including a governor disc coaxially connected for rotation with one of said distributing discs, the other of said distributing discs being connected to said governor disc by at least one flexible member having a fly-weight attached thereto.

30. The fuel injection system, as set forth in claim 11, which includes hydraulic elements for controlling the fuel quantity corresponding to the demands of said engine in dependence upon the engine speed, and a lever system adjusted by a hydraulic element, controlled by the fuel pressure corresponding to the load, such that the movement of fly-weights adjusted regarding to speed causes a relative rotational movement of said discs to a different extent, corresponding to said fuel pressure.

31. The fuel injection system, as set forth in claim 11, which includes means responsive to the temperature of the ambient air for further varying the quantity of fuel passing said orifices, spring means controlling the pressure of said fuel and having a tension controlled by the position of said throttle valve, and said means responsive to the temperature of the ambient air comprises means for changing the variation in the tension of said spring means in dependence upon said throttle valve position.

32. The fuel injection system, as set forth in claim 11, which includes means responsive to the pressure of the ambient air for further varying the quantity of fuel passing said orifices, spring means controlling the pressure of said fuel and having a tension controlled by the position of said throttle valve, and said means responsive to the pressure of the ambient air comprises means for changing the variation in the tension of said spring means in dependence upon said throttle valve position.

33. The fuel injection system, as set forth in claim 11, which includes means responsive to the temperature of the ambient air for further varying the quantity of fuel passing said orifices.

34. The fuel injection system, as set forth in claim 11, which includes means responsive to the pressure of the ambient air for further varying the quantity of fuel passing said orifices.

35. A distributing device, comprising a substantially pressure tight housing having a first member therein defining an orifice therethrough, means for connecting a fluid pressure line in flow communication with said orifice, a second member positioned in said housing in spaced relationship to said first member, having an orifice therethrough, corresponding to said orifice through said first member, at least one distributing disc rotatably positioned in said housing between said first and second members, said distributing disc havng an opening defined therethrough positioned for mating and flow communicating said orifices upon rotation, means for rotating said distributing disc, means for supplying fluid to said orifice defined through said second member, means for varying the quantity of fluid passing through said orifices upon each mating with said opening in said rotating distributing disc in dependence on the speed of rotation thereof, and independent means for varying the quantity of fluid passing through said orifices.

References Cited in the file of this patent

UNITED STATES PATENTS

| | | |
|---|---|---|
| 2,363,576 | Devorak | Nov. 28, 1944 |
| 2,633,187 | Smith | Mar. 31, 1953 |
| 2,667,152 | Lang | Jan. 26, 1954 |

FOREIGN PATENTS

| | | |
|---|---|---|
| 862,358 | France | Nov. 30, 1940 |
| 900,631 | Germany | Dec. 28, 1953 |